(12) United States Patent
Yang et al.

(10) Patent No.: US 9,288,018 B2
(45) Date of Patent: Mar. 15, 2016

(54) METHOD AND APPARATUS FOR TRANSMITTING HARQ-ACK INFORMATION IN A TDD SYSTEM SUPPORTING CARRIER AGGREGATION

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 14/239,812

(22) PCT Filed: Oct. 8, 2012

(86) PCT No.: PCT/KR2012/008129
§ 371 (c)(1),
(2) Date: Feb. 20, 2014

(87) PCT Pub. No.: WO2013/051913
PCT Pub. Date: Apr. 11, 2013

(65) Prior Publication Data
US 2014/0169242 A1   Jun. 19, 2014

Related U.S. Application Data

(60) Provisional application No. 61/544,255, filed on Oct. 6, 2011.

(51) Int. Cl.
*H04L 1/18* (2006.01)
*H04L 27/26* (2006.01)
*H04L 1/00* (2006.01)
*H04L 1/16* (2006.01)

(52) U.S. Cl.
CPC ............ *H04L 1/1893* (2013.01); *H04L 1/0067* (2013.01); *H04L 1/0073* (2013.01); *H04L 1/1607* (2013.01); *H04L 1/18* (2013.01); *H04L 1/1812* (2013.01); *H04L 27/26* (2013.01); *H04L 1/1819* (2013.01)

(58) Field of Classification Search
None
See application file for complete search history.

(56) References Cited

U.S. PATENT DOCUMENTS

| | | | |
|---|---|---|---|
| 2009/0276676 A1 | 11/2009 | Lee et al. | |
| 2010/0202396 A1 | 8/2010 | Won et al. | |
| 2011/0205996 A1 | 8/2011 | Kim et al. | |
| 2011/0243066 A1* | 10/2011 | Nayeb Nazar et al. | 370/328 |

FOREIGN PATENT DOCUMENTS

| | | |
|---|---|---|
| KR | 10-2007-0011030 A | 1/2007 |
| KR | 10-2009-0114802 A | 11/2009 |
| KR | 10-2010-0048865 A | 5/2010 |
| WO | WO 2010/048142 A2 | 4/2010 |
| WO | WO 2010/148319 A1 | 12/2010 |

* cited by examiner

*Primary Examiner* — Ian N Moore
*Assistant Examiner* — Justin T Van Roie
(74) *Attorney, Agent, or Firm* — Birch, Stewart, Kolasch & Birch, LLP

(57) ABSTRACT

The present invention relates to a wireless communication system. More particularly, the present invention relates to a method for transmitting uplink control information in a wireless communication system that supports carrier aggregation and operates in a time division duplex (TDD) scheme, the method comprising a step of transmitting a hybrid automatic repeat request-acknowledgement (HARQ-ACK) for each component carrier (CC) according to a specific parameter; wherein if the specific parameter is smaller than a specific value, the HARQ-ACK for each CC is individually transmitted, and if the specific parameter is equal to or larger than the specific value, the HARQ-ACK for each CC is transmitted using the specific number of bit values corresponding to said HARQ-ACK. The present invention also relates to an apparatus for the method.

10 Claims, 16 Drawing Sheets

METHOD AND APPARATUS FOR TRANSMITTING HARQ-ACK INFORMATION IN A TDD SYSTEM SUPPORTING CARRIER AGGREGATION

This application is the National Phase of PCT/KR2012/008129 filed on Oct. 8, 2012, which claims priority under 35 U.S.C. 119(e) to U.S. Provisional Application No. 61/544,255 filed on Oct. 6, 2011, all of which are hereby expressly incorporated by reference into the present application.

TECHNICAL FIELD

The present invention relates to a wireless communication system and, more specifically, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention is to provide a method for efficiently transmitting control information in a wireless communication system and an apparatus for the same. Another object of the present invention is to provide a method for efficiently transmitting uplink control information in a time division duplexing (TDD) system and an apparatus for the same.

The technical problems solved by the present invention are not limited to the above technical problems and those skilled in the art may understand other technical problems from the following description.

Technical Solution

In an aspect of the present invention, provided herein is a method for transmitting uplink control information in a wireless communication system supporting carrier aggregation and operating in time division duplexing (TDD), the method including: transmitting hybrid automatic repeat request-acknowledgement (HARQ-ACK) information for each component carrier (CC) according to a specific parameter, wherein at least one HARQ-ACK for each CC is transmitted using an individual bit value corresponding to each HARQ-ACK when the specific parameter is less than a specific value, and wherein the at least one HARQ-ACK for each CC is transmitted using a specific number of bit values corresponding to all HARQ-ACKs when the specific parameter is equal to or larger than the specific value.

In another aspect of the present invention, provided herein is a communication device configured to transmit uplink control information in a wireless communication system supporting carrier aggregation and operating in TDD, the communication device including: a radio frequency (RF) unit; and a processor, wherein the processor is configured to transmit HARQ-ACK information for each CC according to a specific parameter, wherein at least one HARQ-ACK for each CC is transmitted using an individual bit value corresponding to each HARQ-ACK when the specific parameter is less than a specific value, and wherein the at least one HARQ-ACK for each CC is transmitted using a specific number of bit values corresponding to all HARQ-ACKs when the specific parameter is equal to or larger than the specific value.

Preferably, the specific value may be 5 and the specific number may be 2.

Preferably, when the specific parameter is 5, mapping relationship between the HARQ-ACK for each CC and the bit values may be given by the following table.

| HARQ-ACK(0), (1), (2), (3), (4) | Bit values |
| --- | --- |
| (A, A, A, N/D, any) | a0, a1 |
| (A, A, A, A) or (A, A, D, D, D) | b0, b1 |
| (A, A, A, A, N/D) or (A, D, D, D, D) | c0, c1 |
| (N/D, any, any, any, any), or (A, N/D, any, any, any) except for (A, D, D, D, D), or (A, A, N/D, any, any) except for (A, A, D, D, D) | d0, d1 |

Here, {(a0, a1), (b0, b1), (c0, c1), (d0, d1)} corresponds to one of {(1, 1), (1, 0), (0, 1), (0, 0)}, {(1, 1), (0, 1), (1, 0), (0, 0)}, {(0, 0), (1, 0), (0, 1), (1, 1)} or {(0, 0), (0, 1), (1, 0), (1, 1)}, A represents ACK (Acknowledgement), D represents DTX (discontinuous transmission), N/D represents NACK (negative ACK) or DTX, any represents one of ACK, NACK, or DTX.

Preferably, when the specific parameter is 6, mapping relationship between the HARQ-ACK for each CC and the bit values may be given by the following table.

| HARQ-ACK(0), (1), (2), (3), (4), (5) | Bit values |
| --- | --- |
| (A, A, A, A, A, A) or (A, A, A, D, D, D) | a0, a1 |
| (A, A, A, A, A, N/D) or (A, A, D, D, D, D) | b0, b1 |
| (A, A, A, A, N/D, any) or (A, D, D, D, D, D) | c0, c1 |
| (N/D, any, any, any, any, any), or (A, N/D, any, any, any, any) except for (A, D, D, D, D, D), or (A, A, N/D, any, any, any) except for (A, A, D, D, D, D), or (A, A, A, N/D, any, any) except for (A, A, A, D, D, D) | d0, d1 |

Here, {(a0, a1), (b0, b1), (c0, c1), (d0, d1)} corresponds to one of {(1, 1), (1, 0), (0, 1), (0, 0)}, {(1, 1), (0, 1), (1, 0), (0, 0)}, {(0, 0), (1, 0), (0, 1), (1, 1)} or {(0, 0), (0, 1), (1, 0), (1, 1)}, A represents ACK, D represents DTX, N/D represents NACK or DTX, any represents one of ACK, NACK, or DTX.

Preferably, when the specific parameter is 7, mapping relationship between the HARQ-ACK for each CC and the bit values may be given by the following table.

| HARQ-ACK(0), (1), (2), (3), (4), (5), (6) | Bit values |
| --- | --- |
| (A, A, A, A, A, A, N/D) or (A, A, A, D, D, D, D) | a0, a1 |
| (A, A, A, A, A, N/D, any) or (A, A, D, D, D, D, D) | b0, b1 |
| (A, A, A, A, A, A) or (A, A, A, A, D, D, D) or (A, D, D, D, D, D, D) | c0, c1 |
| (N/D, any, any, any, any, any, any) or (A, N/D, any, any, any, any, any) except for (A, D, D, D, D, D, D), or (A, A, N/D, any, any, any, any) except for (A, | d0, d1 |

-continued

| HARQ-ACK(0), (1), (2), (3), (4), (5), (6) | Bit values |
|---|---|
| A, D, D, D, D, D), or (A, A, A, N/D, any, any, any) except for (A, A, A, D, D, D, D), or (A, A, A, A, N/D, any, any) except for (A, A, A, A, D, D, D) | |

Here, {(a0, a1), (b0, b1), (c0, c1), (d0, d1)} corresponds to one of {(1, 1), (1, 0), (0, 1), (0, 0)}, {(1, 1), (0, 1), (1, 0), (0, 0)}, {(0, 0), (1, 0), (0, 1), (1, 1)} or {(0, 0), (0, 1), (1, 0), (1, 1)}, A represents ACK, D represents DTX, N/D represents NACK or DTX, any represents one of ACK, NACK, or DTX.

Preferably, when the specific parameter is 8, mapping relationship between the HARQ-ACK for each CC and the bit values may be given by the following table.

| HARQ-ACK(0), (1), (2), (3), (4), (5), (6), (7) | Bit values |
|---|---|
| (A, A, A, A, A, A, N/D, any) or (A, A, A, D, D, D, D, D) | a0, a1 |
| (A, A, A, A, A, A, A, A) or (A, A, A, A, D, D, D) or (A, A, D, D, D, D, D, D) | b0, b1 |
| (A, A, A, A, A, A, A, N/D) or (A, A, A, A, D, D, D, D) or (A, D, D, D, D, D, D, D) | c0, c1 |
| (N/D, any, any, any, any, any, any, any) or (A, N/D, any, any, any, any, any, any) except for (A, D, D, D, D, D, D, D), or (A, A, N/D, any, any, any, any) except for (A, A, D, D, D, D, D, D), or (A, A, A, N/D, any, any, any, any) except for (A, A, A, D, D, D, D, D), or (A, A, A, A, N/D, any, any, any) except for (A, A, A, A, D, D, D, D), or (A, A, A, A, A, N/D, any, any) except for (A, A, A, A, A, D, D, D) | d0, d1 |

Here, {(a0, a1), (b0, b1), (c0, c1), (d0, d1)} corresponds to one of {(1, 1), (1, 0), (0, 1), (0, 0)}, {(1, 1), (0, 1), (1, 0), (0, 0)}, {(0, 0), (1, 0), (0, 1), (1, 1)} or {(0, 0), (0, 1), (1, 0), (1, 1)}, A represents ACK, D represents DTX, N/D represents NACK or DTX, any represents one of ACK, NACK, or DTX.

Preferably, when the specific parameter is 9, mapping relationship between the HARQ-ACK for each CC and the bit values may be given by the following table.

| HARQ-ACK(0), (1), (2), (3), (4), (5), (6), (7), (8) | Bit values |
|---|---|
| (A, A, A, A, A, A, A, A, A) or (A, A, A, A, A, A D, D, D) or (A, A, A, D, D, D, D, D, D) | a0, a1 |
| (A, A, A, A, A, A, A, A, N/D) or (A, A, A, A, A, A, D, D, D) or (A, A, D, D, D, D, D, D, D) | b0, b1 |
| (A, A, A, A, A, A, A, N/D, any) or (A, A, A, A, A, D, D, D, D) or (A, D, D, D, D, D, D, D, D) | c0, c1 |
| (N/D, any, any, any, any, any, any, any, any) or (A, N/D, any, any, any, any, any, any, any) except for (A, D, D, D, D, D, D, D, D), or (A, A, N/D, any, any, any, any, any, any) except for (A, A, D, D, D, D, D, D, D), or (A, A, A, N/D, any, any, any, any, any) except for (A, A, A, D, D, D, D, D, D), or (A, A, A, A, N/D, any, any, any, any) except for (A, A, A, A, D, D, D, D, D), or (A, A, A, A, A, N/D, any, any, any) except for (A, A, A, A, A, D, D, D, D), or (A, A, A, A, A, A N/D, any, any) except for (A, A, A, A, A, A, D, D, D) | d0, d1 |

Here, {(a0, a1), (b0, b1), (c0, c1), (d0, d1)} corresponds to one of {(1, 1), (1, 0), (0, 1), (0, 0)}, {(1, 1), (0, 1), (1, 0), (0, 0)}, {(0, 0), (1, 0), (0, 1), (1, 1)} or {(0, 0), (0, 1), (1, 0), (1, 1)}, A represents ACK, D represents DTX, N/D represents NACK or DTX, any represents one of ACK, NACK, or DTX.

Preferably, when downlink data transmitted without physical downlink control channel (PDCCH) is present, HARQ-ACK(0) may represent an ACK/NACK response to the downlink data transmitted without PDCCH and HARQ-ACK(i) for i>0 may represent an ACK/NACK response to downlink data corresponding to a PDCCH with a DL DAI (downlink downlink assignment index) value V of ((i−1) modulo 4)+1. That is, HARQ-ACK(i) for i=1, 2, 3 or 4 may represent an ACK/NACK response to downlink data corresponding to a PDCCH with a DL DAI (downlink downlink assignment index) value V of i, and HARQ-ACK(i) for i=5, 6, 7 or 8 may represent an ACK/NACK response to downlink data corresponding to a PDCCH with a DL DAI value V of (i−4). When downlink data transmitted without PDCCH is not present, HARQ-ACK(i) may represent an ACK/NACK response to downlink data corresponding to a PDCCH with V of (i modulo 4)+1. That is, HARQ-ACK(i) for i=0, 1, 2 or 3 may represent an ACK/NACK response to downlink data corresponding to a PDCCH with V of i+1, HARQ-ACK(i) for i=4, 5, 6 or 7 may represent an ACK/NACK response to downlink data corresponding to a PDCCH with a DL DAI value V of (i−3) and HARQ-ACK(i) for i=8 may represent an ACK/NACK response to downlink data corresponding to a PDCCH with a DL DAI value V of (i−7).

Preferably, the specific value may be 3, mapping relationship between the HARQ-ACK and the bit values may be given by the following table, A represents ACK, D represents DTX, N/D represents NACK or DTX, any represents one of ACK, NACK, or DTX.

| HARQ-ACK(0) | HARQ-ACK(1) | HARQ-ACK(2) | HARQ-ACK(3) | HARQ-ACK(4) | HARQ-ACK(5) | HARQ-ACK(6) | HARQ-ACK(7) | HARQ-ACK(8) | Bit value (0) | Bit value (1) | Bit value (2) | Bit value (3) |
|---|---|---|---|---|---|---|---|---|---|---|---|---|
| A | A | A | A | A | A | A | A | A | 1 | 0 | 0 | 1 |
| A | A | A | A | A | A | A | A | N/D | 0 | 0 | 0 | 1 |
| A | A | A | A | A | A | A | N/D | any | 1 | 1 | 1 | 0 |
| A | A | A | A | A | A | N/D | Any | any | 0 | 1 | 1 | 0 |
| A | A | A | A | A | N/D | any | Any | any | 1 | 0 | 1 | 0 |
| A | A | A | A | N/D | any | any | Any | any | 0 | 0 | 1 | 0 |
| A | A | A | N/D | Any | any | any | Any | any | 1 | I | 0 | 0 |
| A | A | N/D | any | Any | any | any | Any | any | 0 | 1 | 0 | 0 |
| A | N/D | any | any | Any | any | any | Any | any | 1 | 0 | 0 | 0 |
| N/D | Any | any | any | Any | any | any | Any | any | 0 | 0 | 0 | 0 |

Preferably, the specific number of bits values may be determined by $\lceil \log_2(L+1) \rceil$ when the specific parameter has a value of L.

Preferably, the specific value may be 3, mapping relationship between the HARQ-ACK and the bit values may be given by the following table, A represents ACK, D represents DTX, N/D represents NACK or DTX, any represents one of ACK, NACK, or DTX.

| HARQ-ACK (0) | HARQ-ACK (1) | HARQ-ACK (2) | HARQ-ACK (3) | HARQ-ACK (4) | HARQ-ACK (5) | HARQ-ACK (6) | HARQ-ACK (7) | HARQ-ACK (8) | Bit value (0) | Bit value (1) | Bit value (2) | Bit value (3) |
|---|---|---|---|---|---|---|---|---|---|---|---|---|
| A | A | A | A | A | A | A | A | A | 1 | 0 | 1 | 1 |
| A | A | A | A | A | A | A | A | N/D | 0 | 0 | 1 | 1 |
| A | A | A | A | A | A | A | N/D | any | 0 | 0 | 1 | 0 |
| A | A | A | A | A | A | N/D | Any | any | 1 | 0 | 1 | 0 |
| A | A | A | A | A | N/D | any | Any | any | 1 | 1 | 1 | 0 |
| A | A | A | A | N/D | any | any | Any | any | 0 | 1 | 1 | 0 |
| A | A | A | N/D | any | any | any | Any | any | 0 | 1 | 0 | 0 |
| A | A | N/D | any | any | any | any | Any | any | 1 | 1 | 0 | 0 |
| A | N/D | any | any | any | any | any | Any | any | 1 | 0 | 0 | 0 |
| N/D | Any | any | any | any | any | any | Any | any | 0 | 0 | 0 | 0 |

Preferably, the specific number of bits values may be determined by $\lceil \log_2(L+1) \rceil$ when the specific parameter has a value of L.

Preferably, the specific parameter may represent the number M of downlink subframes corresponding to a UL subframe in which the HARQ-ACK information for each CC is transmitted or an uplink downlink assignment index (UL DAI) value W, and the HARQ-ACK information may be transmitted using PUCCH format 3.

According to the present invention, it is possible to efficiently transmit control information in a wireless communication system. Specifically, it is possible to efficiently transmit uplink control information in a TDD system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

DETAILED DESCRIPTION

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
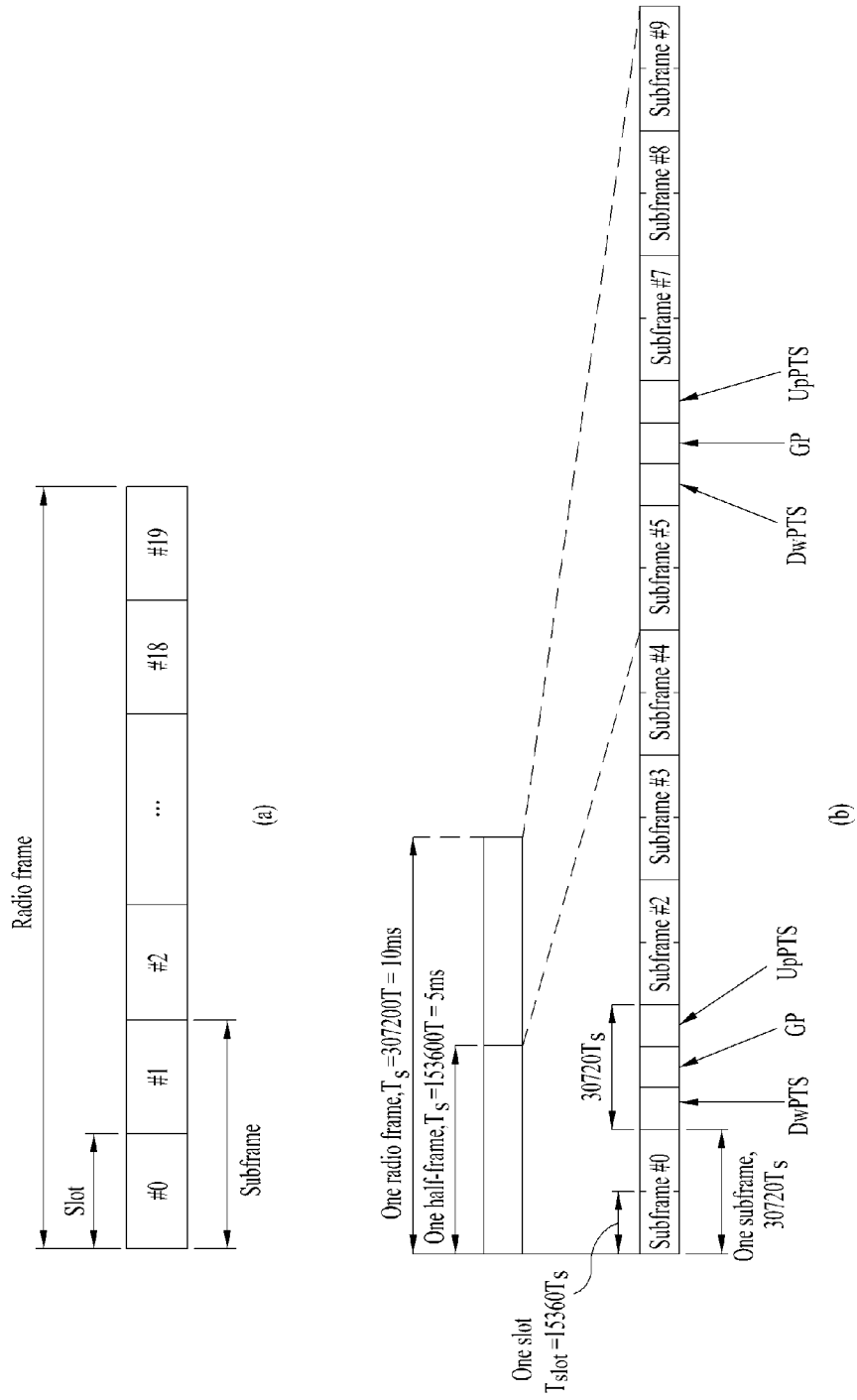
FIG. 1 illustrates a radio frame structure.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure applicable to FDD (frequency division duplex) and a type-2 radio frame structure applicable to TDD (time division duplex).

FIG. 1(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6.

FIG. 1(b) illustrates a type-2 radio frame structure. The type-2 radio frame includes 2 half frames. Each half frame includes 5 subframes each of which consists of 2 slots.

Table 1 shows UL-DL (uplink-downlink) configurations of subframes in a radio frame in the TDD mode.

The radio frame structure is merely exemplary and the number of subframes included in the radio frame, the number of slots included in a subframe, and the number of symbols included in a slot can be vary.

Figure 2:
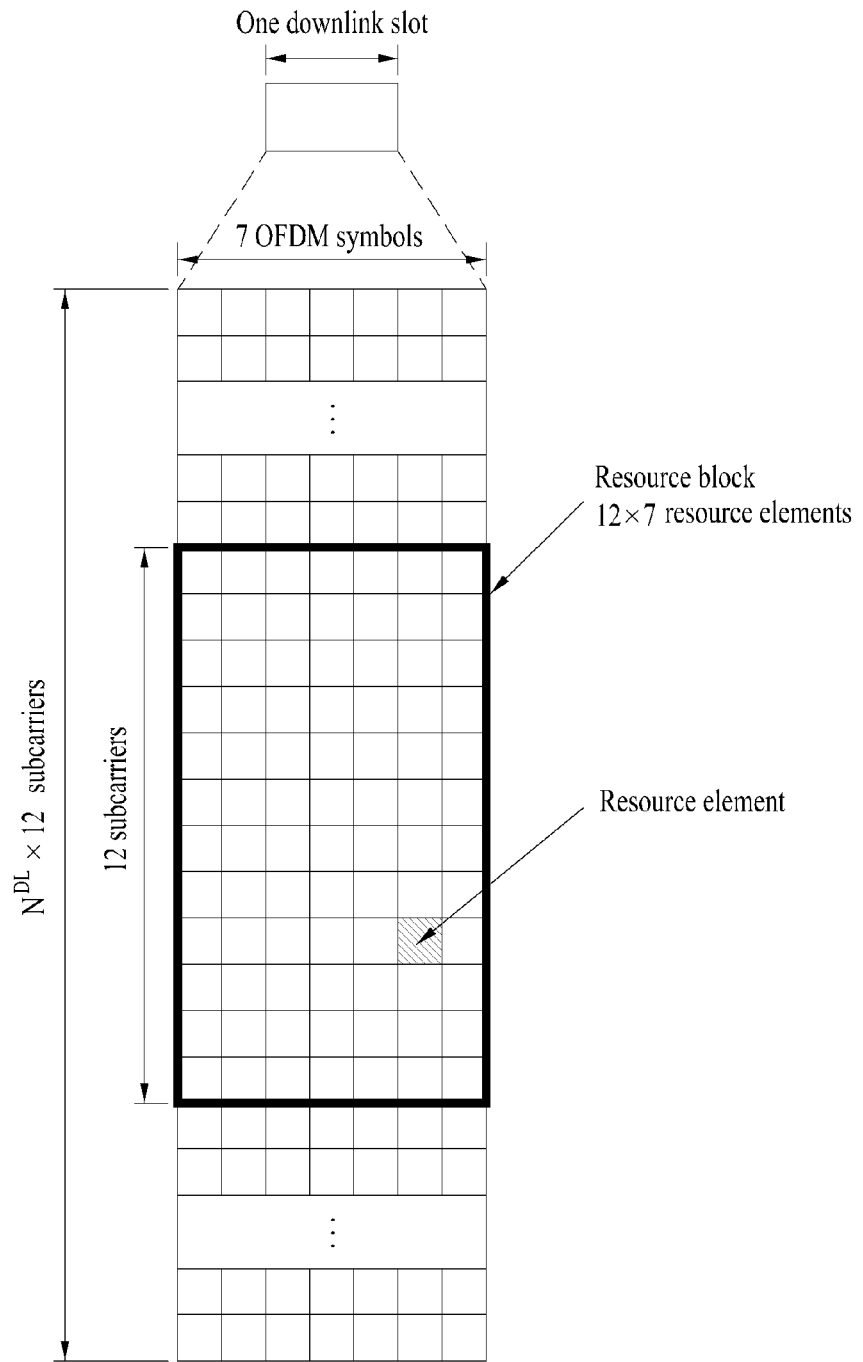
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
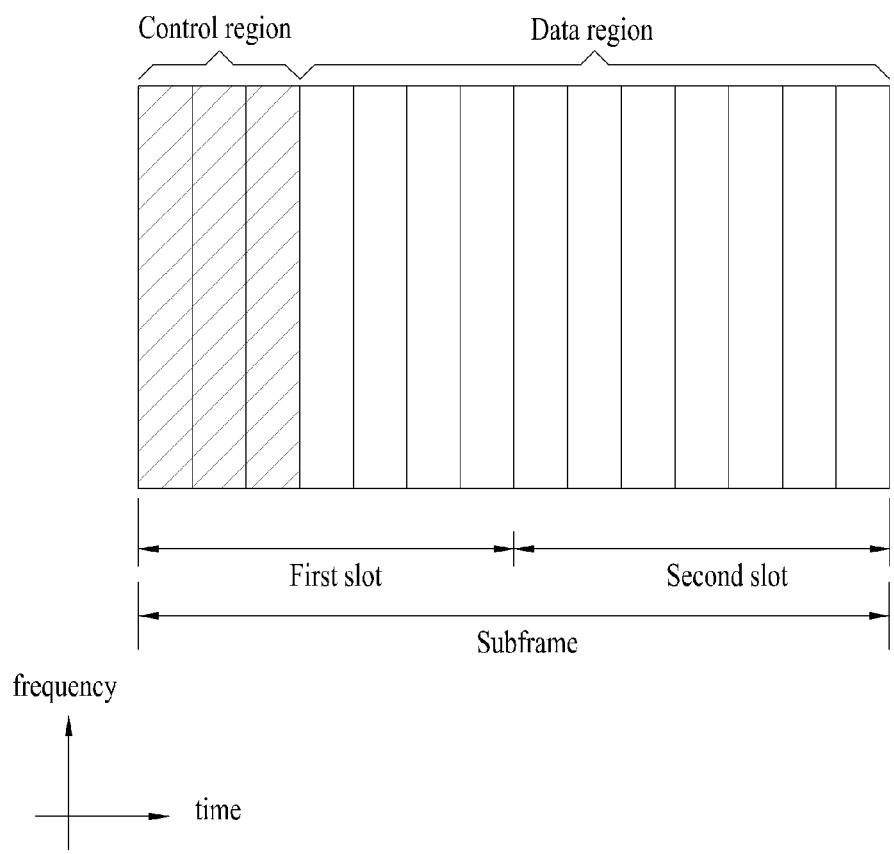
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared channel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe,
U denotes an uplink subframe and
S denotes a special subframe.

The special subframe includes DwPTS (downlink pilot timeslot), GP (guard period), and UpPTS (uplink pilot timeslot). DwPTS is a period reserved for downlink transmission and UpPTS is a period reserved for uplink transmission.

Table 2 shows DwPTS/GP/UpPTS lengths according to special subframe configuration. In Table 2, Ts denotes sampling time.

of OFDM symbols used for transmission of control channels within the subframe. The PHICH is a response of uplink transmission and carries an HARQ acknowledgment (ACK)/negative-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A,

TABLE 2

| | Normal cyclic prefix in downlink | | | Extended cyclic prefix in downlink | | |
|---|---|---|---|---|---|---|
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

2B and 2C for downlink are defined as DCI formats. The DCI formats selectively include information such as hopping flag, RB allocation, MCS (modulation coding scheme), RV (redundancy version), NDI (new data indicator), TPC (transmit power control), cyclic shift DMRS (demodulation reference signal), CQI (channel quality information) request, HARQ process number, TPMI (transmitted precoding matrix indicator), PMI (precoding matrix indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
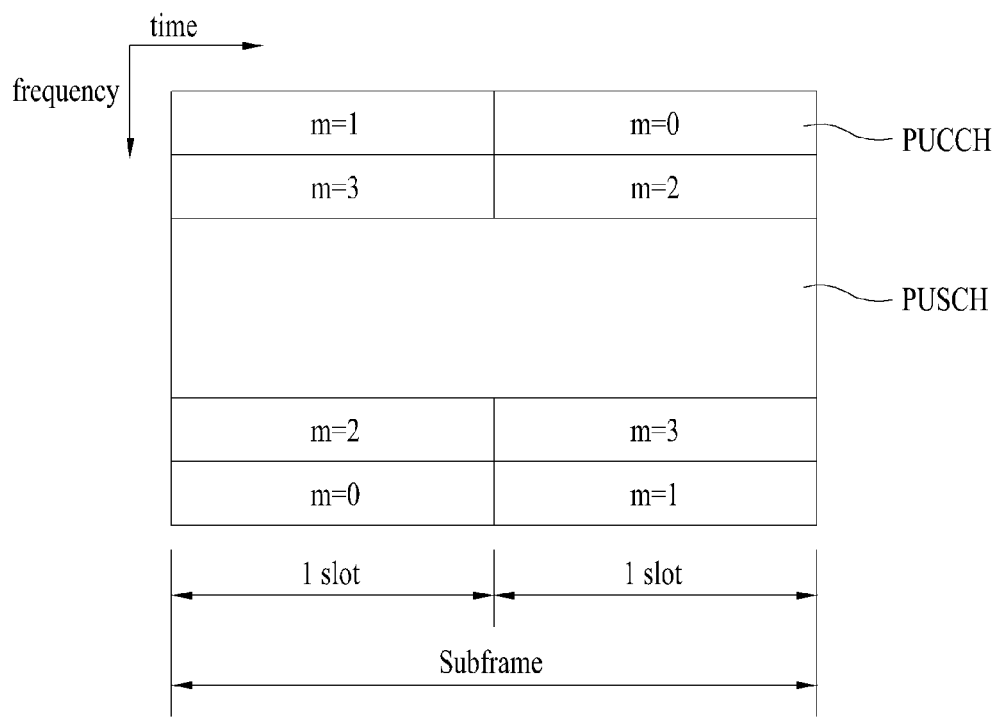
FIG. 4 illustrates an uplink subframe structure.

FIG. 4 illustrates an uplink subframe structure used in LTE.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

CQI (channel quality indicator): This is feedback information about a downlink channel. Feedback information regarding multiple input multiple output (MIMO) includes rank indicator (RI) and precoding matrix indicator (PMI). 20 bits are used for each subframe.

Table 3 shows the mapping relationship between PUCCH formats and UCI in LTE.

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Since LTE UE cannot simultaneously transmit a PUCCH and a PUSCH, the LTE UE multiplexes UCI (e.g. CQI/PMI, HARQ-ACK, RI, etc.) in a PUSCH region when the UCI needs to be transmitted through a subframe in which a PUSCH is transmitted. In LTE-A, a UE can be configured such that the UE cannot simultaneously transmit a PUCCH and a PUSCH. In this case, if UCI (e.g. CQI/PMI, HARQ-ACK, RI, etc.) needs to be transmitted in a subframe in which a PUSCH is transmitted, the UE can multiplex the UCI in a PUSCH region (PUSCH piggybacking).

Figure 5:
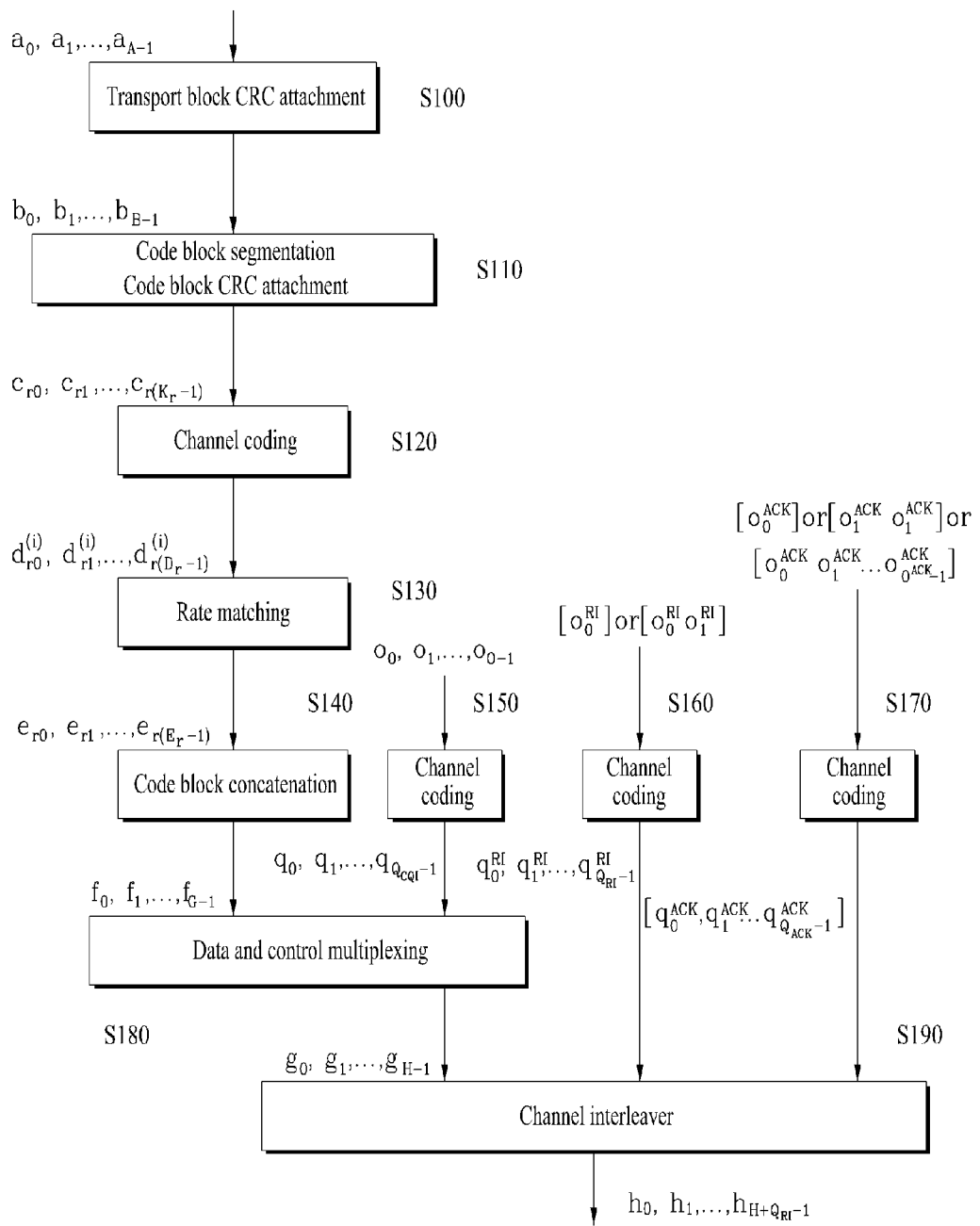
FIG. 5 illustrates a procedure for processing UL-SCH data and control information.

FIG. 5 illustrates a procedure of processing UL-SCH data and control information.

Referring to FIG. 5, error detection is performed in such a manner that a CRC (cyclic redundancy check) is attached to a UL-SCH transport block (TB) (S100).

The whole TB is used to calculate CRC parity bits. The TB has bits of $a_0, a_1, a_2, a_3, \ldots, a_{A-1}$. The parity bits are $p_0, p_1, p_2, p_3, \ldots, p_{L-1}$. The TB has a size of A and the number of parity bits is L.

After attachment of the CRC to the TB, code block segmentation and CRC attachment to a code block are performed (S110). Bits $b_0, b_1, b_2, b_3, \ldots, b_{B-1}$ are input for code block segmentation. Here, B denotes the number of bits of the TB (including the CRC). Bits $c_{r0}, c_{r1}, c_{r2}, c_{r3}, \ldots c_{r(Kr-1)}$ are obtained from code block segmentation. Here, r denotes a code block number (r=0, 1, ..., C−1), Kr denotes the number of bits of a code block r, and C denotes the total number of code blocks.

Channel coding follows code block segmentation and CRC attachment to a code block (S120). Bits $d^{(i)}_{r0}, d^{(i)}_{r1}, d^{(i)}_{r2}, d^{(i)}_{r3}, \ldots, d^{(i)}_{r(Kr-1)}$ are obtained from channel coding. Here, i=0, 1, 2 and Dr denotes the number of bits of an i-th coded stream for the code block r (i.e. DR=Kr+4). In addition, r denotes the code block number (r=0, 1, ..., C−1), Kr denotes the number of bits of the code block r, and C represents the total number of code blocks. Turbo coding may be used as channel coding.

Channel coding is followed by rate matching (S130). Bits $e_{r0}, e_{r1}, e_{r2}, e_{r3}, \ldots, e_{r(Er-1)}$ are obtained from rate matching. Here, Er denotes the number of rate-matched bits of an r-th code block (r=0, 1, ..., C−1) and C denotes the total number of code blocks.

Rate matching is followed by code block connection (S140). Bits $f_0, f_1, f_2, f_3, \ldots, f_{G-1}$ are obtained from code block connection. Here, G denotes the number of coded bits for transmission. When, control information transmission and UL-SCH transmission are multiplexed, bits used for control information transmission are not included in G. The bits $f_0, f_1, f_2, f_3, \ldots, f_{G-1}$ correspond to a UL-SCH codeword.

In case of UCI, channel quality information (CQI and/or PMI) ($o_0, o_1, \ldots, o_{o-1}$), RI ([$o_0^{RI}$] or [$o_0^{RI} o_1^{RI}$]) and HARQ-ACK ([$o_0^{ACK}$], [$o_0^{ACK} o_1^{ACK}$] or [$o_0^{ACK} o_1^{ACK} o_{0^{ACK}-1}^{ACK}$]) are independently channel-coded (S150 to S170). Channel coding of UCI is performed on the basis of the number of coded symbols for control information. For example, the number of coded symbols can be used for rate matching of coded control information. The number of coded symbols corresponds to the number of modulation symbols and the number of REs in the following process.

Channel coding of HARQ-ACK is performed using an input bit sequence [$o_0^{ACK}$], [$o_0^{ACK} o_1^{ACK}$] or [$o_0^{ACK} o_1^{ACK} o_{o^{ACK}-1}^{ACK}$] of step S170. [$o_0^{ACK}$] and [$o_0^{ACK} o_1^{ACK}$] respectively correspond to 1-bit HARQ-ACK and 2-bit HARQ-ACK, and [$o_0^{ACK} o_1^{ACK} o_{o^{ACK}-1}^{ACK}$] refers to HARQ-ACK composed of 3 bits or more (i.e. $O^{ACK}>2$). ACK is coded into 1 and NACK is coded into 0. Repetition coding is used for 1-bit HARQ-ACK. A (3, 2) simplex code is used for 2-bit HARQ-ACK and encoded data can be cyclically repeated. In the case of $O^{ACK}>2$, a (32, 0) block code is used.

$Q_{ACK}$ denotes the total number of coded bits. A bit sequence $q_0^{ACK}, q_1^{ACK}, q_2^{ACK}, \ldots, q_{Q_{ACK}-1}^{ACK}$ is obtained by combining coded HARQ-ACK blocks. To adjust the length of the bit sequence to $Q_{ACK}$, part of the last coded HARQ-ACK block may be combined (i.e. rate matching). $Q_{ACK}=Q'_{ACK} \times Q_m$ and $Q'_{ACK}$ denotes the number of coded symbols for HARQ-ACK and $Q_m$ is a modulation order. $Q_m$ is set to the same as that of UL-SCH data.

The coded UL-SCH bits $f_0, f_1, f_2, f_3, \ldots, f_{G-1}$ and coded CQI/PMI bits $q_0, q_1, q_2, q_3, \ldots, q_{CQI-1}$ are input to a data/control multiplexing block (S180). The data/control multiplexing block outputs bits $g_0, g_1, g_2, g_3, \ldots, g_{H'-1}$. $g_i$ is a column vector of length Qm ($i=0, \ldots, H'-1$). $H'=H/Qm$ and $H=(G+Q_{CQI})$. H denotes the total number of coded bits allocated for UL-SCH data and CQI/PMI.

The output of the data/control multiplexing block, $g_0, g_1, g_2, g_3, \ldots, g_{H-1}$, a coded rank indicator $q_0^{RI}, q_1^{RI}, q_2^{RI}, \ldots, q_{Q'_{RI}-1}^{RI}$ and coded HARQ-ACK $q_0^{ACK}, q_1^{ACK}, q_2^{ACK}, \ldots, q_{Q'_{ACK}-1}^{ACK}$ are input to a channel interleaver (S190). $g_i$ is a column vector of length Qm for CQI/PMI, and $i=0, \ldots, H'-1$ ($H'=H/Qm$). $q_i^{ACK}$ is a column vector length Qm for ACK/NACK, and $i=0, \ldots, Q'_{ACK-1}$ ($Q'_{ACK}=Q_{ACK}/Qm$). $q_i^{RI}$ is a column vector of length Qm for RI and $i=0, \ldots, Q'_{RI-1}$ ($Q'_{RI}=Q_{RI}/Qm$).

The channel interleaver multiplexes control information and UL-SCH data for PUSCH transmission. Specifically, the channel interleaver maps the control information and UL-SCH data to a channel interleaver matrix corresponding to a PUSCH resource.

The channel interleaver outputs a bit sequence $h_0, h_1, h_2, \ldots, h_{GH+QRI-1}$ read from the channel interleaver matrix column by column. The read bit sequence is mapped to a resource grid. $H''=H'+Q'_{RI}$ modulation symbols are transmitted through a subframe.

Figure 6:
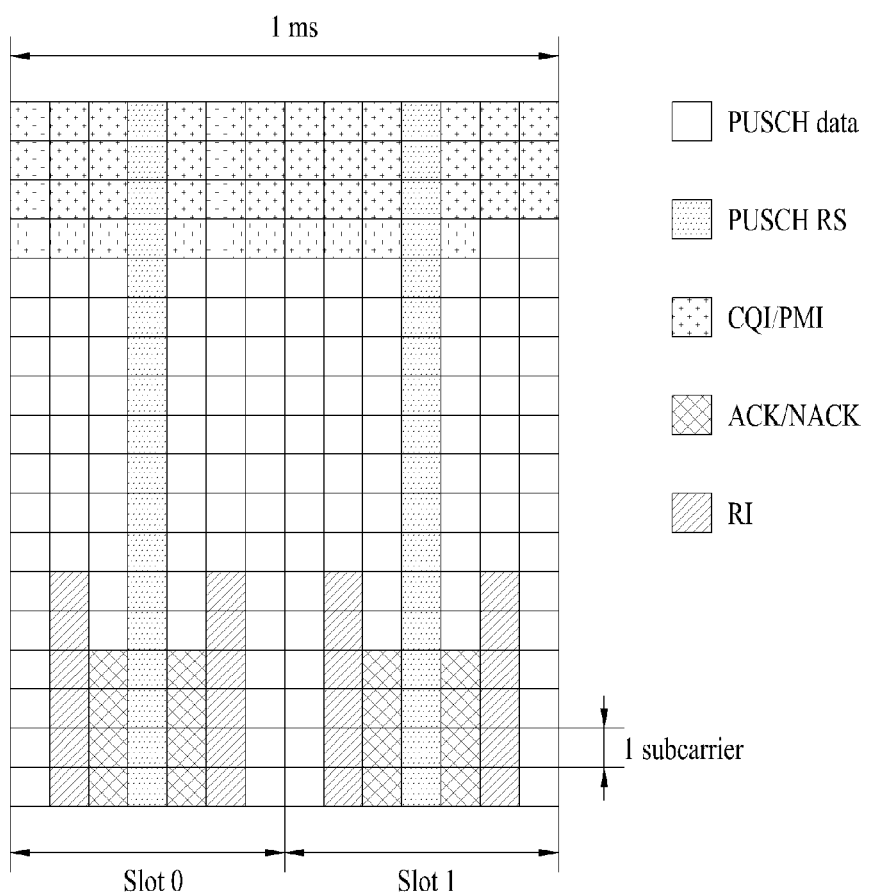
FIG. 6 illustrates multiplexing control information and UL-SCH data on a PUSCH.

FIG. 6 illustrates multiplexing of control information and UL-SCH data on a PUSCH. When a UE attempts to transmit control information through a subframe to which PUSCH transmission is allocated, the UE multiplexes the control information (UCI) and UL-SCH data prior to DFT-spreading. The control information includes at least one of CQI/PMI, HARQ ACK/NACK and RI. The number of REs used for transmission of each of CQI/PMI, HARQ ACK/NACK and RI is based on a MCS (modulation and coding scheme) and an offset values allocated for PUSCH transmission. The offset value performs different coding rates according to control information and is semi-statically set by a higher layer (e.g. RRC) signal. The UL-SCH data and control information are not mapped to the same RE. The control information is mapped such that the same occupies both slots of a subframe.

Figure 7:
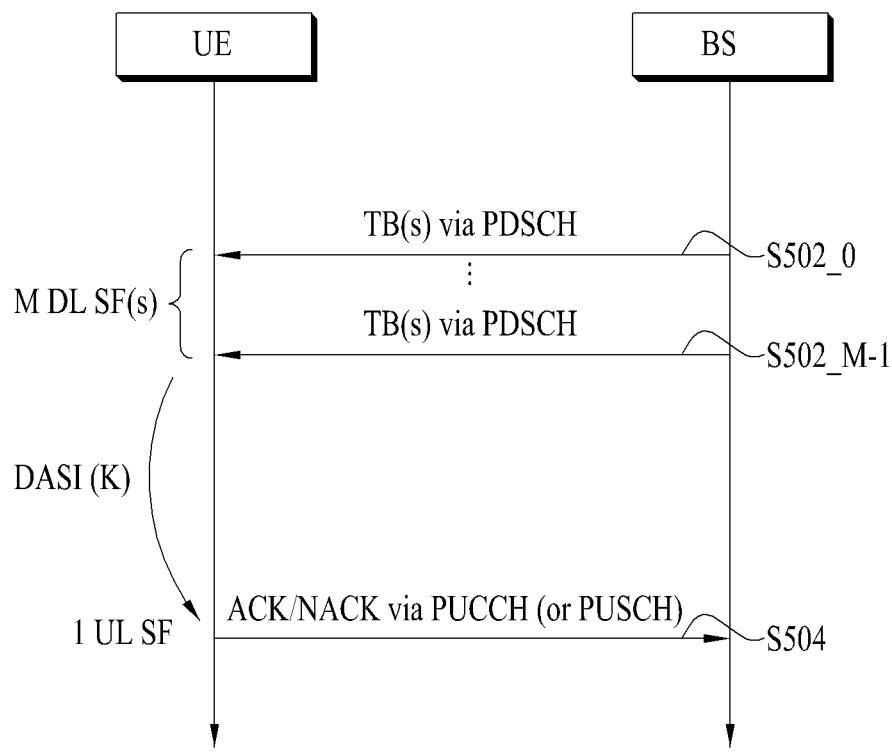
FIG. 7 illustrates a TDD uplink ACK/NACK transmission procedure in a single cell situation.

Referring to FIG. 6, CQI and/or PMI (CQI/PMI) resources are located at the start of a UL-SCH data resource, sequentially mapped to all SC-FDMA symbols on one subcarrier, and then mapped to the next subcarrier. CQI/PMI is mapped from left to right in a subframe, that is, in a direction in which an SC-FDMA symbol index increases. PUSCH data (UL-SCH data) is rate-matched in consideration of the quantity of CQI/PMI resources (i.e. the number of coded symbols). The same modulation order as the UL-SCH data is used for CQI/PMI. ACK/NACK is embedded into part of an SC-FDMA resource to which the UL-SCH data is mapped through puncturing. ACK/NACK is located beside an RS and mapped to SC-FDMA symbols from bottom to top, that is, in a direction in which a subcarrier index increases. In the case of normal CP, SC-FDMA symbols for ACK/NACK correspond to SC-FDMA symbols #2/#5 in each slot, as shown in FIG. 7. A coded RI is located beside a symbol for ACK/NACK irrespective of whether ACK/NACK is actually transmitted through the corresponding subframe.

In LTE, control information (using QPSK, for example) can be scheduled such that it is transmitted on a PUSCH without UL-SCH data. The control information (CQI/PMI, RI and/or ACK/NACK) is multiplexed before DFT-spreading in order to maintain low CM (cubic metric) single-carrier characteristics. ACK/NACK, RI and CQI/PMI are multiplexed in a manner similar to the process shown in FIG. 7. SC-FDMA symbols for ACK/NACK are located by an RS, and a resource to which CQI is mapped can be punctured. The number of REs for ACK/NACK and RI is based on a reference MCS (CQI/PMI MCS) and an offset parameter. The reference MCS is calculated from a CQI payload size and resource allocation. Channel coding and rate matching for control signaling without UL-SCH data correspond to the above-described control signaling with UL-SCH data.

A description will be given of an ACK/NACK transmission procedure in a TDD system. TDD divides a frequency band into DL subframes and UL subframes in the time domain (refer to FIG. 1(b)). Accordingly, in the case of asymmetric DL/UL data traffic, a larger number of DL subframes or a larger number of UL subframes may be allocated. Therefore, DL subframes may not one-to-one correspond to UL subframe in TDD. Particularly, when the number of DL subframes is greater than the number of UL subframes, a UE may need to transmit ACK/NACK responses to a plurality of PDSCHs (and/or PDCCHs that require ACK/NACK responses) on a plurality of DL subframes through a single UL subframe. For example, the ratio of the number of DL subframes to the number of UL subframes can be set to DL subframe:UL subframe=M:1. Here, M is the number of DL subframes corresponding to a single ULK subframe. In this case, the UE needs to transmit ACK/NACK responses to a plurality of PDSCHs (or PDCCHs that require ACK/NACK responses) on M DL subframes, through a single UL subframe.

FIG. 7 illustrates a TDD UL ACK/NACK transmission process in a single cell situation.

Referring to FIG. 7, a UE can receive one or more PDSCH signals in M DL subframes (SFs) (S502_0 to S502_M−1). Each PDSCH signal is used to transmit one or more (e.g. 2) transport blocks (TBs) (or codewords) according to transmission mode. A PDCCH signal requiring an ACK/NACK response, for example, a PDCCH signal indicating SPS release (simply, SPS release PDCCH signal) may also be received in step S502_0 to S502_M−1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically (refer to FIGS. 5 and 6), ACK/NACK can be transmitted through a PUSCH when a PUSCH is transmitted at ACK/NACK transmission time. Various PUCCH formats shown in Table 3 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (downlink association set index).

Table 4 shows DASI (K: {k0, k1, . . . , $k_{M-1}$}) defined in LTE(-A). Table 4 shows spacing between a UL subframe transmitting ACK/NACK and a DL subframe relating to the UL subframe. Specifically, when a PDCCH indicating PDSCH transmission and/or (downlink) SPS release is present in a subframe n-k (k∈K), the UE transmits ACK/NACK in a subframe n.

been transmitted thereto. Accordingly, an error may be generated when ACK/NACK is generated.

To solve this problem, a DAI (downlink assignment index) is included in a PDCCH in a TDD system. The DAI indicates an accumulated value (i.e. counted value) of PDCCH(s) corresponding to PDSCH(s) from DL subframe(s) n-k (k ⊂ K) to the current subframe and PDCCH(s) indicating SPS release. For example, when three DL subframes correspond to one UL subframe, PDSCHs transmitted in the three DL subframes are sequentially given indexes (sequentially counted) and transmitted on PDCCHs scheduling the PDSCHs. The UE can be aware that previous PDCCHs have been successfully received through DAI information included in the PDCCHs. A DAI included in a PDSCH-scheduling PDCCH and SPS release PDCCH is called DAI-c (counter), or simply DAI for convenience.

Table 5 shows a value $V_{DAI}^{DL}$ indicated by a DL DAI field. DL DAI can be simply referred to as V in this specification.

TABLE 5

| DAI MSB, LSB | $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most Significant bit,
LSB: Least Significant Bit

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | — | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD operation, a UE needs to transmit ACK/NACK signals for one or more DL signals (e.g. PDSCHs) received through M DL SFs, through a single UL SF. ACK/NACK signals for a plurality of DL SFs are transmitted through a single UL SF according to the following methods.

1) ACK/NACK bundling: ACK/NACK bits for a plurality of data units (e.g. PDSCH, SPS release PDCCH, etc.) are combined according to a logical AND operation. For example, upon successful decoding of all data units, an Rx node (e.g. UE) transmits ACK signals. If any of data units has not been decoded (detected), the Rx node does not transmit a NACK signal or no signal.

2) Channel selection: Upon reception of a plurality of data units (e.g. PDSCHs, SPS release PDCCHs, etc.), a UE occupies a plurality of PUCCH resources for ACK/NACK transmission. ACK/NACK responses to the plurality of data units are discriminated according to combinations of PUCCH resources used for ACK/NACK transmission and transmitted ACK/NACK information (e.g. bit values). This is also referred to as ACK/NACK selection and PUCCH selection.

In TDD, the following problem may be encountered when a UE transmits an ACK/NACK signal to a BS.

Figure 8:
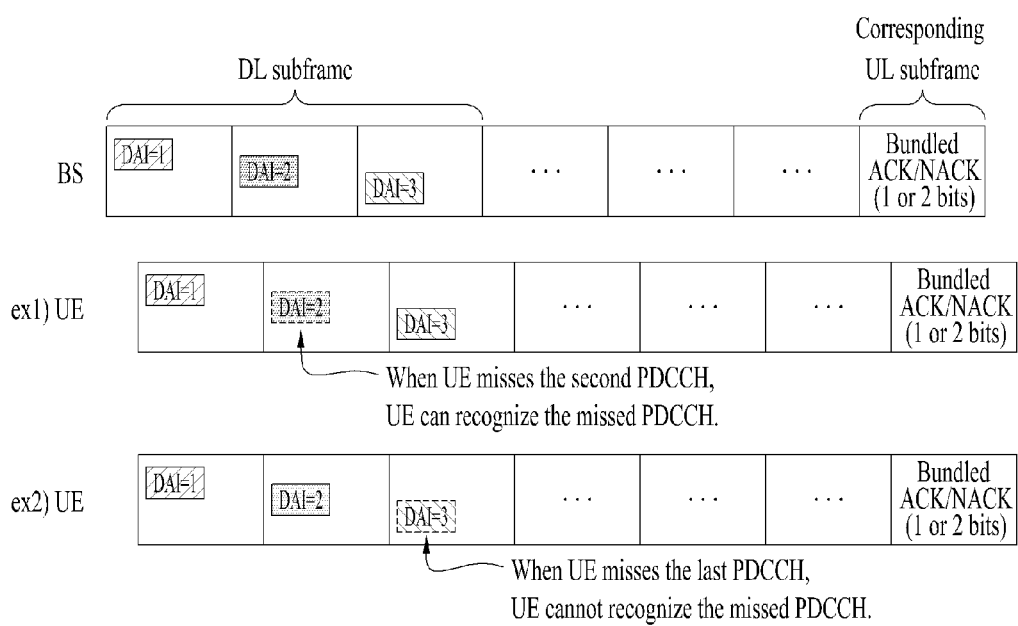
FIG. 8 illustrates ACK/NACK transmission using a DAI (downlink assignment index)

When the UE has missed some of PDCCH(s) transmitted from the BS in a plurality of subframes, the UE cannot be aware that PDSCHs corresponding to missed PDCCHs have FIG. 8 illustrates ACK/NACK transmission using a DL DAI. This example is based on a TDD system with 3 DL subframes:1 UL subframe. It is assumed that a UE transmits ACK/NACK using a PUSCH resource. In LTE, when ACK/NACK is transmitted through a PUSCH, 1-bit or 2-bit bundled ACK/NACK is transmitted.

Referring to FIG. 8, when the UE misses the second PDCCH, the UE can be aware that the second PDCCH has been missed because a DL DAI value of the third PDCCH is different from the number of detected PDCCHs. In this case, the UE can process an ACK/NACK response to the second PDCCH as NACK (or NACK/DTX). When the UE misses the last PDCCH, the UE cannot be aware that the last PDCCH has been missed because a DAI value of the last detected PDCCH corresponds to the number of detected PDCCHs (i.e. DTX). Accordingly, the UE recognizes that only two PDCCHs have been scheduled during a DL subframe period. In this case, an error is generated during an ACK/NACK feedback process because the UE bundles only ACK/NACKs corresponding to the first two PDCCHs. To solve this problem, a PUSCH-scheduling PDCCH (i.e. UL grant PDCCH) includes a DAI field (UL DAI field). The UL DAI field is a 2-bit field and represents information about the number of scheduled PDCCHs.

Specifically, the UE assumes that at least one downlink allocation is lost (i.e. DTX is generated) when $V_{DAI}^{UL} \neq (U_{DAI}+N_{SPS}-1) \mod 4+1$ and generates NACK for all codewords according to bundling. Here, $U_{DAI}$ denotes the total number of DL grant PDCCHs and SPS release PDCCHs detected from a subframe n−k (k⊂K) (refer to Table 4) and $N_{SPS}$ denotes the number of SPS PDSCHs and corresponds to 0 or 1.

Table 6 shows a value $V_{DAI}^{UL}$ indicated by the UL DAI field. UL DAI can be simply referred to as W in this specification.

TABLE 6

| DAI MSB, LSB | $V_{DAI}^{UL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most Significant bit,
LSB: Least Significant Bit

Figure 9:
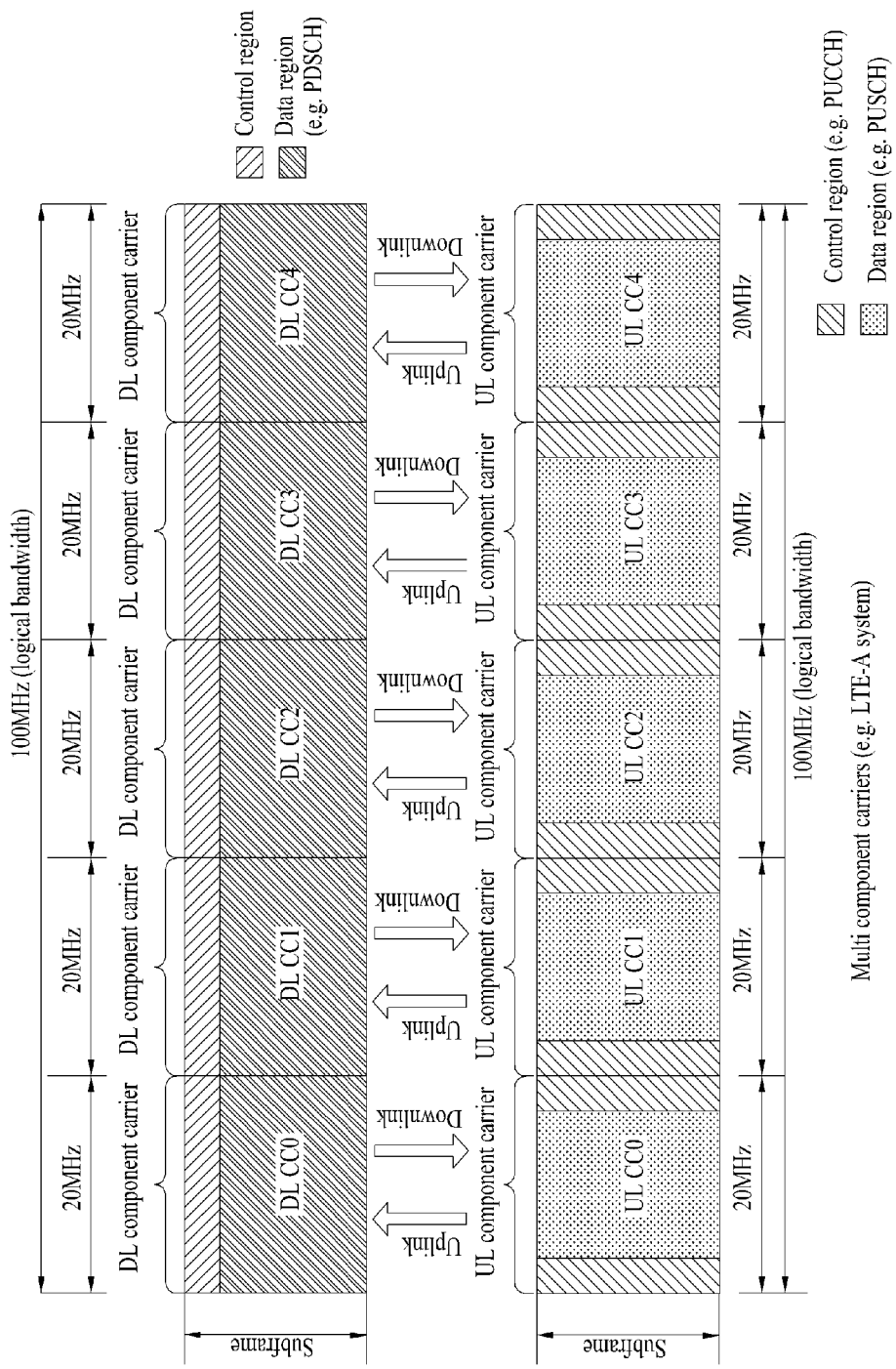
FIG. 9 illustrates a CA (carrier aggregation) communication system.
Figure 10:
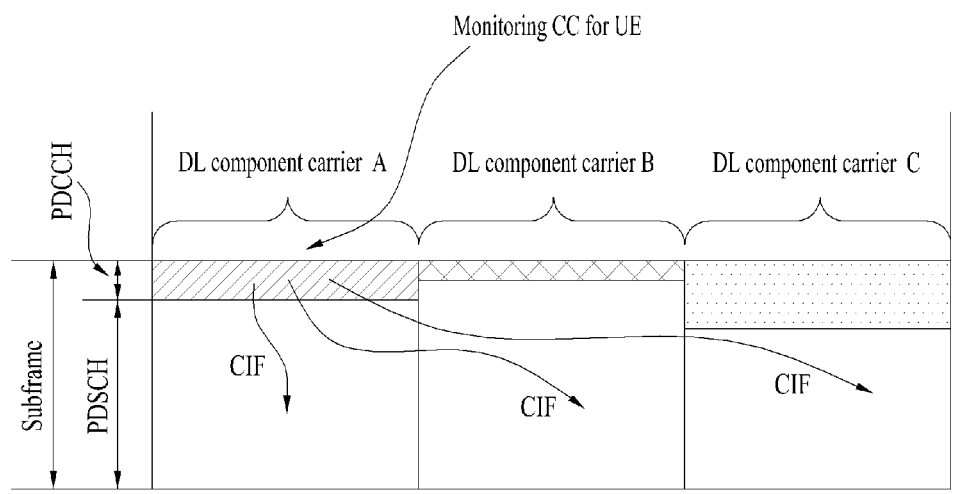
FIG. 10 illustrates cross-carrier scheduling.

FIG. 9 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 9, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L(<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources [refer to 36.300 V10.2.0 (2010-12) 5.5 Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

LTE-A supports aggregation of a plurality of CCs (i.e. CA) and considers a method of transmitting ACK/NACK for a plurality of downlink data (e.g. data transmitted through a PDSCH), transmitted through a plurality of CCs, using a specific CC (e.g. PCC) only. As described above, a CC other than the PCC can be referred to as an SCC. In addition, LTE-A can support cross-CC scheduling in the case of CA. In this case, a CC (e.g. scheduled CC) can be pre-set such that the CC can be DL/UL scheduled through a specific CC (e.g. scheduling CC) (i.e. a downlink/uplink grant PDCCH with respect to the scheduling CC can be received). The scheduling CC can perform DL/UL scheduling thereon. ACK/NACK for uplink data (e.g. data transmitted through a PUSCH), which is transmitted through the scheduling/scheduled CC, can be transmitted through the scheduling CC (i.e. PHICH of the scheduling CC). The scheduling CC can be referred to as a monitoring CC (MCC), the scheduled CC can be referred to as a secondary CC (SCC) and ACK/NACK for UL data can be referred to as "PHICH".

When two CCs (e.g. PCC and SCC) are aggregated in a TDD based LTE-A system, channel selection can be used for ACK/NACK transmission using a PUCCH. A description will be given of a method for transmitting ACK/NACK when a channel selection mode is set in the case of TDD CA. The channel selection mode can refer to channel selection using PUCCH format 1b. The number of DL subframes corresponding to a single UL subframe is defined as M for convenience of description. "DTX" means that data has not be received or a PDCCH has not been received, "NACK/DTX" represents NACK or DTX, and "any" represents one of ACK, NACK and DTX. In addition, the maximum number of transport blocks (TBs) that can be transmitted through a CC is defined as Ntb. DL data (e.g. a PDSCH transmitted according to SPS) transmitted without a PDCCH can be referred to as DL data w/o PDCCH.

ACK/NACK state mapping to each CC when M=1, 2, 3 and 4 can be performed as follows.

- When M=1
  - When Ntb=1, ACK-rsp(1) represents an ACK/NACK response to a corresponding TB and can be mapped as shown in Table 7.

TABLE 7

| ACK-rsp(1) |
|---|
| ACK |
| NACK/DTX |

- When Ntb=2, ACK-rsp(i) represents an ACK/NACK response to an i-th TB and can be mapped as shown in Table 8.

TABLE 8

| ACK-rsp(1), ACK-rsp(2) |
|---|
| ACK, ACK |
| NACK/DTX, ACK |
| ACK. NACK/DTX |
| NACK/DTX, NACK/DTX |

- When M=2
  - ACK-rsp(i) represents an ACK/NACK response to DL data transmitted through an i-th DL subframe and can be mapped as shown in Table 9.

TABLE 9

| ACK-rsp(1), ACK-rsp(2) |
|---|
| ACK, ACK |
| NACK/DTX, ACK |
| ACK. NACK/DTX |
| NACK/DTX, NACK/DTX |

- When M=3
  - When DL data w/o PDCCH is not present, ACK-rsp(i) represents an ACK/NACK response to DL data corresponding to a PDCCH with DAI=i and can be mapped as shown in Table 10.
  - When DL data w/o PDCCH is present, ACK-rsp(1) represents an ACK/NACK response to the DL data w/o PDCCH, ACK-rsp(i+1) refers to an ACK/NACK response to DL data corresponding to a PDCCH with DAI=i and ACK/NACK responses can be mapped as shown in Table 10.

TABLE 10

| ACK-rsp(1), ACK-rsp(2), ACK-rsp(3) | Ref-state |
|---|---|
| ACK, ACK, ACK | ACK, ACK |
| ACK, ACK, NACK/DTX | NACK/DTX, ACK |
| ACK, NACK/DTX, any | ACK, NACK/DTX |
| NACK/DTX, any, any | NACK/DTX, NACK/DTX |

- When M=4
  - When DL data w/o PDCCH is not present, ACK-rsp(i) represents an ACK/NACK response to DL data corresponding to a PDCCH with DAI=i and can be mapped as shown in Table 11.
  - When DL data w/o PDCCH is present, ACK-rsp(1) represents an ACK/NACK response to the DL data w/o PDCCH, ACK-rsp(i+1) refers to an ACK/NACK response to DL data corresponding to a PDCCH with DAI=i and ACK/NACK responses can be mapped as shown in Table 11.

TABLE 11

| ACK-rsp(1), ACK-rsp(2), ACK-rsp(3), ACK(4) | Ref-state |
|---|---|
| ACK, ACK, ACK, NACK/DTX | ACK, ACK |
| ACK, ACK, NACK/DTX, any | NACK/DTX, ACK |
| (ACK, D, D, D) or (ACK, ACK, ACK, ACK) | ACK, NACK/DTX |
| (NACK/DTX, any, any, any) or (ACK, NACK/DTX, any, any), except for (ACK, D, D, D) | NACK/DTX, NACK/DTX |

The UE can transmit b(0)b(1) on a PUCCH resource selected from A PUCCH resources ($n^{(1)}_{PUCCH,i}$) in a UL subframe n (1i A−1 and A $\{2, 3, 4\}$). Specifically, the UE transmits an ACK/NACK signal in the UL subframe n using PUCCH format 1b according to Tables 12, 13 and 14.

Table 12 is a mapping table for channel selection, which can be used in LTE-A when two CCs are aggregated, M=1 and A=2.

TABLE 12

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

$n^{(1)}_{PUCCH,0}$ can be allocated an implicit PUCCH resource linked to a PDCCH (i.e. PCC-PDCCH) that schedules a PCC (or PCell) and $n^{(1)}_{PUCCH,1}$ can be allocated an implicit PUCCH resource linked to a PDCCH (i.e. SCC-PDCCH) that schedules an SCC or an explicit PUCCH resource reserved through RRC according to whether or not cross-CC scheduling is applied. For example, $n^{(1)}_{PUCCH,0}$ can be allocated an implicit PUCCH resource linked to the PCC-PDCCH and $n^{(1)}_{PUCCH,1}$ can be allocated an implicit PUCCH resource linked to the SCC-PDCCH when cross-CC scheduling is employed.

Table 13 is a mapping table for channel selection, which can be used in LTE-A when two CCs are aggregated, M=1 and A=3.

TABLE 13

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

When a PCC corresponds to a MIMO CC and an SCC corresponds to a non-MIMO CC, $n^{(1)}_{PUCCH,0}$ and $n^{(1)}_{PUCCH,1}$ can be allocated implicit PUCCH resources linked to the PCC-PDCCH and $n^{(1)}_{PUCCH,2}$ can be allocated an implicit PUCCH resource linked to the SCC-PDCCH or an explicit PUCCH resource reserved through RRC according to whether or not cross-CC scheduling is applied. If the PCC corresponds to a non-MIMO CC and the SCC corresponds to a MIMO CC, $n^{(1)}_{PUCCH,0}$ can be allocated an implicit PUCCH resource linked to the PCC-PDCCH and $n^{(1)}_{PUCCH,1}$ and $n^{(1)}_{PUCCH,2}$ can be allocated implicit PUCCH resources linked to the SCC-PDCCH or explicit PUCCH resources reserved through RRC according to whether or not cross-CC scheduling is employed.

Table 14 is a mapping table for channel selection, which can be used in LTE-A when two CCs are aggregated, M≤2 and A=4.

TABLE 14

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

Implicit PUCCH resources linked to a PDCCH (i.e. PCC-PDCCH) that schedules a PCC (or PCell) can be allocated to $n^{(1)}_{PUCCH,0}$ and/or $n^{(1)}_{PUCCH,1}$ irrespective of cross-CC scheduling and implicit PUCCH resource linked to a PDCCH (i.e. SCC-PDCCH) that schedules an SCC or explicit PUCCH resources reserved through RRC can be allocated to $n^{(1)}_{PUCCH,2}$ and/or $n^{(1)}_{PUCCH,3}$ according to whether or not cross-CC scheduling is applied. For example, when M=2 and cross-CC scheduling is applied, implicit PUCCH resources linked to PCC-PDCCHs of first and second DL SFs can be allocated to $n^{(1)}_{PUCCH,0}$ and $n^{(1)}_{PUCCH,1}$ and implicit PUCCH resources linked to SCC-PDCCHs of the first and second DL SFs can be allocated to $n^{(1)}_{PUCCH,2}$ and $n^{(1)}_{PUCCH,3}$.

Table 15 shows TBs, HARQ-ACK(j) and PUCCH resources when M=1.

TABLE 15

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Primary cell | TB1 Secondary cell | TB2 Secondary cell | NA |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

* TB: transport block, NA: not available

Table 16 illustrates TBs, HARQ-ACK(j) and PUCCH resources when M=2.

TABLE 16

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

A description will be given of mapping of an ACK/NACK state with respect to each CC to a PUCCH resource and QPSK symbol according to M with reference to Tables 12, 13 and 14.

■ When M=1
  ○ When two CCs correspond to Ntb=1, ACK-rsp(1) of a PCC and ACK-rsp(1) of an SCC can be respectively mapped to HARQ-ACK(0) and HARQ-ACK(1) of Table 12.
  ○ When the PCC corresponds to Ntb=1 and the SCC corresponds to Ntb=2, ACK-rsp(1) of the PCC can be mapped to HARQ-ACK(0) of Table 13 and ACK-rsp(1) and ACK-rsp(2) of the SCC can be respectively mapped to HARQ-ACK(1) and HARQ-ACK(2) of Table 13.
  ○ When the PCC corresponds to Ntb=2 and the SCC corresponds to Ntb=1, ACK-rsp(1) and ACK-rsp(2) of the PCC can be mapped to HARQ-ACK(0) and HARQ-ACK(1) of Table 13 and ACK-rsp(1) of the SCC can be mapped to HARQ-ACK(2) of Table 13.
  ○ When the two CCs correspond to Ntb=2, ACK-rsp(1) and ACK-rsp(2) of the PCC can be respectively mapped to HARQ-ACK(0) and HARQ-ACK(1) of Table 14 and ACK-rsp(1) and ACK-rsp(2) of the SCC can be respectively mapped to HARQ-ACK(2) and HARQ-ACK(3) of Table 14.

■ When M=2
  ○ ACK-rsp(1) and ACK-rsp(2) of the PCC and ACK-rsp(1) and ACK-rsp(2) of the SCC can be respectively mapped to HARQ-ACK(0), HARQ-ACK(1), HARQ-ACK(2) and HARQ-ACK(3) of Table 14.

For example, when ACK-rsp(1) and ACK-rsp(2) of the PCC correspond to (ACK, NACK/DTX) and ACK-rsp(1) and ACK-rsp(2) of the SCC correspond to (NACK/DTX, ACK), HARQ-ACK(0),(1),(2),(3)=(ACK, NACK/DTX, NACK/DTX, ACK) in Table 14 is selected and ACK/NACK can be transmitted using a combination of a PUCCH resource and a QPSK symbol, $n^{(1)}_{PUCCH,2}$, b(0)b(1)=0,1, which corresponds to HARQ-ACK(0),(1),(2),(3)=(ACK, NACK/DTX, NACK/DTX, ACK).

■ When M=3
  ○ In the case of PCC, ACK-rsp(1),(2),(3) can be replaced by corresponding Ref-states of Table 10 and Ref-states of Table 10 can be replaced by HARQ-ACK(0),(1) of Table 14.
  ○ In the case of SCC, ACK-rsp(1),(2),(3) can be replaced by corresponding Ref-states of Table 10 and Ref-states of Table 10 can be replaced by HARQ-ACK(2),(3) of Table 14.

For example, when ACK-rsp(1),(2),(3) of the PCC correspond to (ACK, ACK, ACK), Ref-states corresponding thereto are (ACK, ACK). When ACK-rsp(1),(2),(3) of the SCC corresponds to (ACK, NACK/DTX, any), Ref-states corresponding thereto are (ACK, NACK/DTX). Accordingly, HARQ-ACK(0),(1),(2),(3)=(ACK, ACK, ACK, NACK/DTX) in Table 14 is selected and ACK/NACK can be transmitted using a combination of a PUCCH resource and a QPSK symbol, $n^{(1)}_{PUCCH,2}$, b(0)b(1)=1,1, which corresponds to HARQ-ACK(0),(1),(2),(3)=(ACK, ACK, ACK, NACK/DTX).

○ Final channel selection mapping achieved through the above procedure is shown in Table 17. Table 17 is a mapping table for channel selection, which can be used in LTE-A when two CCs are aggregated and M=3.

TABLE 17

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Implicit PUCCH resources linked to a PDCCH (i.e. PCC-PDCCH) that schedules a PCC (or PCell) can be allocated to $n^{(1)}_{PUCCH,0}$ and/or $n^{(1)}_{PUCCH,1}$ irrespective of cross-CC scheduling and implicit PUCCH resource linked to a PDCCH (i.e. SCC-PDCCH) that schedules an SCC or explicit PUCCH resources reserved through RRC can be allocated to $n^{(1)}_{PUCCH,2}$ and/or $n^{(1)}_{PUCCH,3}$ according to whether or not cross-CC scheduling is applied. For example, implicit PUCCH resources linked to PCC-PDCCHs corresponding to DAI-c of 1 and DAI-c of 2 can be allocated to $n^{(1)}_{PUCCH,0}$ and $n^{(1)}_{PUCCH,1}$, respectively, and implicit PUCCH resources linked to SCC-PDCCHs corresponding to DAI-c of 1 and DAI-c of 2 can be allocated to $n^{(1)}_{PUCCH,2}$ and $n^{(1)}_{PUCCH,3}$, respectively, in a TDD situation.

■ When M=4
  ○ In the case of PCC, ACK-rsp(1),(2),(3),(4) can be replaced by corresponding Ref-states of Table 11 and Ref-states of Table 11 can be replaced by HARQ-ACK(0),(1) of Table 14.
  ○ In the case of SCC, ACK-rsp(1),(2),(3),(4) can be replaced by corresponding Ref-states of Table 11 and Ref-states of Table 11 can be replaced by HARQ-ACK(2),(3) of Table 14.

For example, when ACK-rsp(1),(2),(3),(4) of the PCC correspond to (ACK, ACK, NACK/DTX, any), Ref-states corresponding thereto are (NACK/DTX, ACK). When ACK-rsp(1),(2),(3),(4) of the SCC correspond to (ACK, any, any, any), Ref-states corresponding thereto are (NACK/DTX, DTX). Accordingly, HARQ-ACK(0),(1),(2),(3)=(NACK/DTX, ACK, NACK/DTX, NACK/DTX) in Table 14 is selected and ACK/NACK can be transmitted using a combination of a PUCCH resource and a QPSK symbol, $n^{(1)}_{PUCCH,1}$, b(0)b(1)=0,1, which corresponds to HARQ-ACK(0),(1),(2),(3)=(NACK/DTX, ACK, NACK/DTX, NACK/DTX).

○ Final channel selection mapping achieved through the above procedure is shown in Table 18. Table 18 is a mapping table for channel selection, which can be used in LTE-A when two CCs are aggregated and M=4.

TABLE 18

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |

TABLE 18-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), | $n_{PUCCH,0}^{(1)}$ | 1, 1 | 0, 1, 0, 0 |

TABLE 18-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation $b(0), b(1)$ | RM Code Input Bits $o(0), o(1), o(2), o(3)$ |
|---|---|---|---|---|
| NACK, any, any, any | except for (ACK, DTX, DTX, DTX) NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | | No Transmission | 0, 0, 0, 0 |
| DTX, any, any, any | (ACK, NACK/DTX, any, any), except for (ACK, DTX, DTX, DTX) | | No Transmission | 0, 0, 0, 0 |

$n_{PUCCH,0}^{(1)}$, $n_{PUCCH,1}^{(1)}$, $n_{PUCCH,2}^{(1)}$ and $n_{PUCCH,1}^{(1)}$ can be allocated as shown in Table 17.

Figure 11:
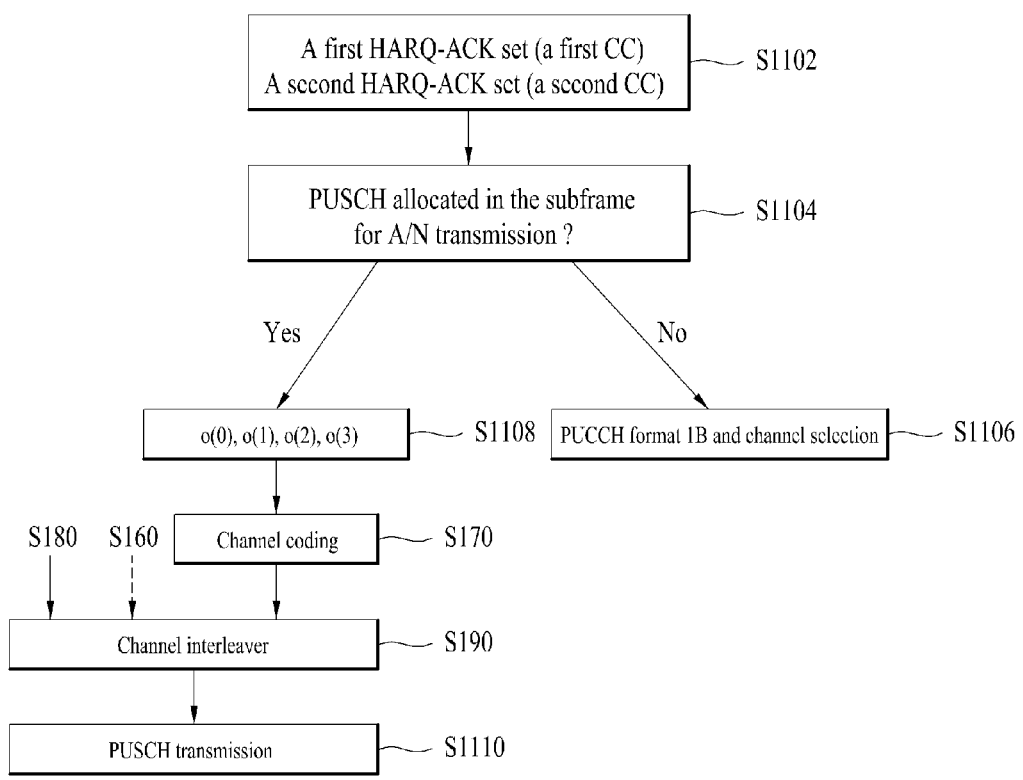
FIG. 11 illustrates a channel selection based ACK/NACK transmission procedure in the case of carrier aggregation in TDD LTE-A.

FIG. 11 illustrates a channel selection based ACK/NACK transmission procedure when carriers are aggregated in TDD LTE-A. TDD CA assumes a case in which two CCs (e.g. PCC and SCC) are aggregated.

Referring to FIG. 11, a UE generates a first HARQ-ACK set for a first CC (or cell) and a second HARQ-ACK set for a second CC (or cell) (S1102). Then, the UE checks whether a PUSCH is allocated to a subframe (referred to as an ACK/NACK subframe) for ACK/NACK transmission (S1104). When no PUSCH is allocated to the ACK/NACK subframe, the UE transmits ACK/NACK information using PUCCH format 1b and channel selection (refer to Tables 12 to 18). When a PUSCH is allocated to the ACK/NACK subframe, the UE multiplexes ACK/NACK bits in the PUSCH. Specifically, the UE generates an ACK/NACK bit sequence (e.g. o(0), o(1), o(2), o(3) of Tables 17 and 18) corresponding to the first HARQ-ACK set and the second HARQ-ACK set (S1108). The ACK/NACK bit sequence passes through channel coding (S170 of FIG. 5) and a channel interleaver (S190 of FIG. 5) and is transmitted through the PUSCH. Channel coding may be performed using a Reed-Muller (RM) code, Tail-biting convolutional code, etc.

In FIG. 11, ACK/NACK transmission through a PUSCH can be performed with reference to UL DAI (simply, W) in a UL grant PDCCH that schedules the PUSCH. It is assumed that M=4 in an ACK/NACK subframe. In this case, channel selection mapping (Table 18) based on the fixed value M (=4) is used for ACK/NACK transmission through a PUCCH, whereas channel selection mapping (e.g. Table 17 in the case of W=3 and Table 14 in the case of W=2) based on a value W (≤M) in a UL grant PDCCH is used for ACK/NACK transmission through a PUSCH. That is, when ACK/NACK is piggybacked on a PUSCH, the UE replaces M by W and transmits ACK/NACK using channel selection mapping based on W. This is described in more detail below according to W. In the following description, DL data transmitted through a PCC can be referred to as PCC DL data and DL data transmitted through an SCC can be referred to as SCC DL data for convenience. In addition, W represents a value indicated by a UL DAI field in a UL grant PDCCH and V represents a value indicated by a DL DAI field in a DL grant PDCCH.

■ When W=1
 ○ When both the PCC and SCC correspond to Ntb=1
HARQ-ACK(0) is an ACK/NACK response to PCC DL data corresponding to a PDCCH with V=1 or an ACK/NACK response to DL data w/o PDCCH.
HARQ-ACK(1) is an ACK/NACK response to SCC DL data corresponding to a PDCCH with V=1.
 ○ When the PCC corresponds to Ntb=2 and the SCC corresponds to Ntb=1
HARQ-ACK(0),(1) are individual ACK/NACK responses to TBs of PCC DL data corresponding to a PDCCH with V=1, or ACK/NACK responses to DL data w/o PDCCH (in this case, the ACK/NACK response to the DL data w/o PDCCH can be mapped to HARQ-ACK(1) and HARQ-ACK(0) can be mapped to DTX).
HARQ-ACK(2) is an ACK/NACK response to SCC DL data corresponding to a PDCCH with V=1.
 ○ When the PCC corresponds to Ntb=1 and the SCC corresponds to Ntb=2
HARQ-ACK(0) is an ACK/NACK response to PCC DL data corresponding to a PDCCH with V=1, or an ACK/NACK response to DL data w/o PDCCH.
HARQ-ACK(1),(2) are individual ACK/NACK responses to TBs of SCC DL data corresponding to a PDCCH with V=1.
 ○ When both the PCC and SCC correspond to Ntb=2
HARQ-ACK(0),(1) are individual ACK/NACK responses to TBs of PCC DL data corresponding to a PDCCH with V=1, or ACK/NACK responses to DL data w/o PDCCH (in this case, the ACK/NACK response to the DL data w/o PDCCH can be mapped to HARQ-ACK(1) and HARQ-ACK(0) can be mapped to DTX).
HARQ-ACK(2),(3) are individual ACK/NACK responses to TBs of SCC DL data corresponding to a PDCCH with V=1.

○ HARQ-ACK(i) is determined as a final RM code input bit o(i) for ACK/NACK piggybacking on a PUSCH (through a procedure of mapping A to 1 and mapping N/D to 0).

■ When W=2
○ HARQ-ACK(0),(1) are ACK/NACK responses to PCC DL data corresponding to PDCCHs with V=1 and V=2, respectively. When DL data w/o PDCCH is present, HARQ-ACK(1) may be an ACK/NACK response to DL data w/o PDCCH.
○ HARQ-ACK(2),(3) are ACK/NACK responses to SCC DL data corresponding to PDCCHs with V=1 and V=2, respectively.
○ HARQ-ACK(i) is determined as a final RM code input bit o(i) for ACK/NACK piggybacking on a PUSCH (through a procedure of mapping ACK to bit '1' and mapping NACK/DTX to bit '0').

■ When W=3
○ HARQ-ACK(0),(1),(2) are ACK/NACK responses to PCC DL data corresponding to PDCCHs with V=1, V=2 and V=3, respectively. When DL data w/o PDCCH is present, HARQ-ACK(0) may be an ACK/NACK response to DL data w/o PDCCH and HARQ-ACK(1),(2) may be ACK/NACK responses to PCC DL data corresponding to PDCCHs with V=1 and V=2, respectively.
○ SCC HARQ-ACK(0),(1),(2) are ACK/NACK responses to SCC DL data corresponding to PDCCHs with V=1, V=2 and V=3, respectively.
○ ACK/NACK piggybacking on a PUSCH is performed using RM code input bits o(0), o(1), o(2), o(3) corresponding to all ACK/NACK states (PCC HARQ-ACK(0),(1),(2) and SCC HARQ-ACK(0),(1),(2)) in Table 17.
○ Consequently, RM code input bits corresponding to HARQ-ACK(0),(1),(2) of an arbitrary CC can be defined as shown in Table 19. The arbitrary CC is referred to as an XCC for convenience. RM code input bits are determined as o(0), o(1) when XCC=PCC and determined as o(2), o(3) when XCC=SCC.

TABLE 19

| XCC HARQ-ACK(0), (1), (2) | RM code input bits |
|---|---|
| ACK, ACK, ACK | 1, 1 |
| ACK, ACK, NACK/DTX | 1, 0 |
| ACK, NACK/DTX, any | 0, 1 |
| NACK/DTX, any, any | 0, 0 |

■ When W=4
○ PCC HARQ-ACK(0),(1),(2),(3) are ACK/NACK responses to PCC DL data corresponding to PDCCHs with V=1, V=2, V=3 and V=4, respectively When DL data w/o PDCCH is present, HARQ-ACK(0) may be an ACK/NACK response to DL data w/o PDCCH and HARQ-ACK(1),(2),(3) may be ACK/NACK responses to PCC DL data corresponding to PDCCHs with V=1, V=2 and V=3, respectively.
○ SCC HARQ-ACK(0),(1),(2),(3) are ACK/NACK responses to SCC DL data corresponding to PDCCHs with V=1, V=2, V=3 and V=4, respectively.
○ ACK/NACK piggybacking on a PUSCH is performed using RM code input bits o(0), o(1), o(2), o(3) corresponding to all ACK/NACK states (PCC HARQ-ACK(0),(1),(2),(3) and SCC HARQ-ACK(0),(1),(2),(3)) in Table 18.
○ Consequently, RM code input bits corresponding to HARQ-ACK(0),(1),(2),(3) of the XCC can be defined as shown in Table 20. RM code input bits are determined as o(0), o(1) when XCC=PCC and determined as o(2), o(3) when XCC=SCC.

TABLE 20

| XCC HARQ-ACK(0), (1), (2), (3) | RM code input bits |
|---|---|
| ACK, ACK, ACK, NACK/DTX | 1, 1 |
| ACK, ACK, NACK/DTX, any | 1, 0 |
| (ACK, DTX, DTX, DTX) or (ACK, ACK, ACK, ACK) | 0, 1 |
| (NACK/DTX, any, any, any) or (ACK, NACK/DTX, any, any) except for (ACK, DTX, DTX, DTX) | 0, 0 |

ACK/NACK state-to-RM code input bits mapping shown in Tables 19 and 20 is based on maximization of the Euclidian distance between ACK/NACK states to minimize the number of ACK/NACK response errors when bit errors are generated and maintenance of gray coding between neighboring ACK/NACK states (i.e. two ACK/NACK states having different ACK/NACK responses and the same ACK/NACK response). In the case of Table 20, specific ACK/NACK states are inevitably mapped to the same bits in order to represents all ACK/NACK states for a CC using only two bits. Accordingly, when W (or M)=4, only the ACK/NACK state (ACK, DTX, DTX, DTX) can be mapped to the bits to which (ACK, ACK, ACK, ACK) is mapped in order to minimize ACK/NACK transmission performance deterioration. Since the probability that ACK/NACK states for scheduled/transmitted four DL data become (ACK, DTX, DTX, DTX), that is, the probability that reception of sequentially scheduled three PDCCHs fails consecutively is very low, compared to other ACK/NACK states including ACK, ACK/NACK transmission performance deterioration can be minimized.

A next-generation TDD system can consider a method of coding ACK/NACK information using an RM code, for example, based on an ACK/NACK compression scheme and then transmitting the coded ACK/NACK information through a PUCCH resource (e.g. PUCCH format 3) capable of supporting a large payload size for transmission of a plurality of carrier-aggregated ACK/NACK. The ACK/NACK compression scheme refers to configuration of an ACK/NACK state with consecutive ACKs based on an initial value of V and increasing value of V and mapping the ACK/NACK state. Specifically, when channel selection is applied to ACK/NACK transmission through a PUCCH, RM code input bits corresponding to each ACK/NACK state used when ACK/NACK is piggybacked on a PUSCH can be transmitted using PUCCH format 3. Here, RM code input bit mapping can be performed with reference to ACK/NACK state-to-RM code input bit mapping based on M (or W). That is, when ACK/NACK is piggybacked on a PUSCH, M can be used for ACK/NACK state-to-RM code input bit mapping based on received W (or M).

A description will be given of a method for transmitting ACK/NACK using PUCCH format 3 in the case of carrier aggregation in TDD LTE-A with reference to FIGS. 12 and 13.

Figure 12:
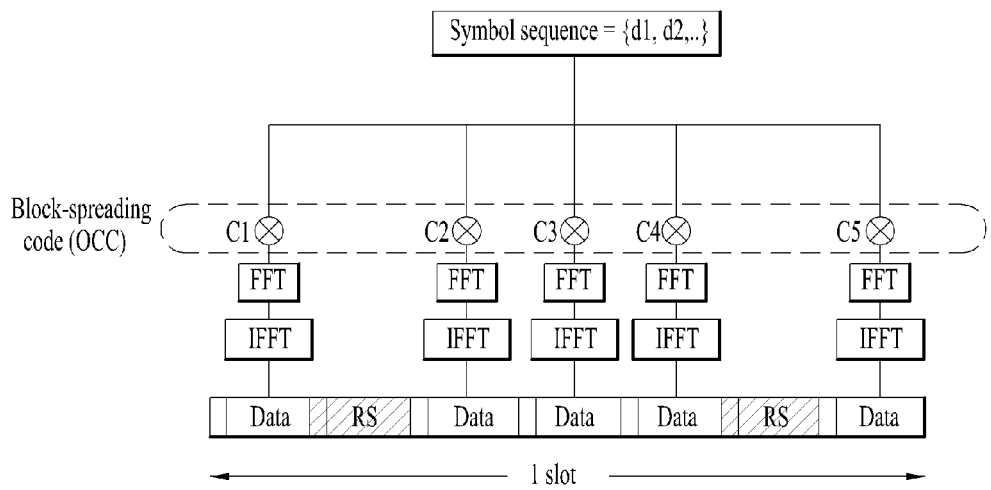
FIG. 12 illustrates a slot level PUCCH format 3 structure.

FIG. 12 illustrates a slot level PUCCH format 3 structure. In PUCCH format 3, a plurality of ACK/NACK information is transmitted through joint coding (e.g. Reed-Muller coding, Tail-biting convolutional coding, etc.), block-spreading and SC-FDMA modulation.

Referring to FIG. 12, a symbol sequence is transmitted over a frequency domain and OCC (orthogonal cover code)

based time-domain spreading is applied to the symbol sequence. Control signals of multiple UEs can be multiplexed into the same RB using an OCC. Specifically, 5 SC-FDMA symbols (i.e. UCI data part) are generated from one symbol sequence {d1, d2, . . . } using an OCC (C1 to C5) with length-5. Here, the symbol sequence {d1, d2, . . . } may mean a modulated symbol sequence or a codeword bit sequence.

An ACK/NACK payload for PUCCH format 3 is configured per CC and then configured ACK/NACK payloads are contiguous according to cell index order. Specifically, HARQ-ACK feedback bits for a c-th serving cell (or DL CC) are given as $o_{c,0}^{ACK}, o_{c,1}^{ACK}, \ldots,$ $$O^{ACK}_{c,o_c^{ACK}-1}(c \geq 0).$$

$o_c^{ACK}$ represents the number of bits (i.e. size) of a HARQ-ACK payload for the c-th serving cell. When a transmission mode supporting single TB transmission is set or spatial bundling is used for the c-th serving cell, $o_c^{ACK}$ can be set as $o_c^{ACK}=B_c^{DL}$. If a transmission mode supporting transmission of multiple (e.g. 2) TBs is set and spatial bundling is not used for the c-th serving cell, $o_c^{ACK}$ can be set as $o_c^{ACK}=2B_c^{DL}$. When HARQ-ACK feedback bits are transmitted through a PUCCH or W corresponding to a PUSCH is not present although the HARQ-ACK feedback bits are transmitted through the PUSCH (e.g. SPS based PUSCH), $B_c^{DL}=M$. M denotes the number of elements in a set K defined in Table 4. When TDD UL-DL configurations correspond to #1, #2, #3, #4 and #6 and HARQ-ACK feedback bits are transmitted through a PUSCH, $B_c^{DL}=W_{DAI}^{UL}$. Here, $W_{DAI}^{UL}$ denotes a value indicated by a UL DAI field in a UL grant PDCCH and is simply represented as W. In the case of TDD UL-DL configuration #5, $B_c^{DL}=W_{DAI}^{UL}+4\lceil(U-W_{DAI}^{UL})/4\rceil$. Here, U represents a maximum value from among values Uc. Uc denotes a total number of PDSCHs received in a subframe n-k and PDCCHs indicating (downlink) SPS release in a c-th serving cell. A subframe n represents a subframe in which HARQ-ACK feedback bits are transmitted and $\lceil\ \rceil$ denotes a ceiling function.

When a transmission mode supporting single TB transmission is set or spatial bundling is used for the c-th serving cell, the position of each HARQ-ACK bit in the HARQ-ACK payload of the serving cell corresponds to $o_{c,DAI(k)-1}^{ACK}$. DAI (k) represents a DL DAI value of a PDCCH detected from DL subframe n-k. When a transmission mode supporting transmission of multiple (e.g. 2) TBs is set and spatial bundling is not used for the c-th serving cell, the position of each HARQ-ACK bit in the HARQ-ACK payload of the serving cell corresponds to $o_{c,2DAI(k)-1}^{ACK}$ and $o_{c,2DAI(k)-2}^{ACK}$. Here, $o_{c,2DAI(k)-1}^{ACK}$ represents HARQ-ACK for codeword 0 and $o_{c,2DAI(k)-2}^{ACK}$ represents HARQ-ACK for codeword 1. Codewords 0 and 1 respectively correspond to TBs 0 and 1 or TBs 1 and 0 according to swiping. When PUCCH format 3 is transmitted in a subframe set for SR transmission, HARQ-ACK bit+SR 1-bit are transmitted through PUCCH format 3.

Figure 13:
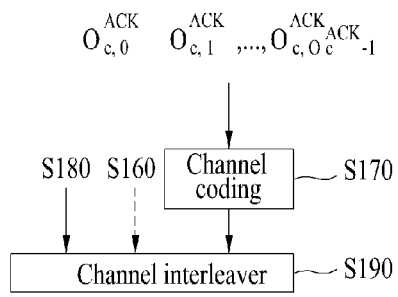
FIG. 13 illustrates a procedure for processing UL-SCH data and control information when HARQ-ACK is transmitted through a PUSCH in a PUCCH format 3 mode.

FIG. 13 illustrates a procedure of processing UL-SCH data and control information when ACK/NACK is transmitted on a PUSCH in PUCCH format 3. FIG. 13 shows a part related to ACK/NACK in the block diagram of FIG. 5.

Referring to FIG. 13, a HARQ-ACK payload input to a channel coding block (S170) is configured according to a method defined for PUCCH format 3. That is, the HARQ-ACK payload is configured per cell and then configured ACK/NACK payloads are contiguous according to cell index order. Specifically, HARQ-ACK feedback bits for a c-th serving cell (or DL CC) are given as $o_{c,0}^{ACK}, o_{c,1}^{ACK}, \ldots,$ $$O^{ACK}_{c,o_c^{ACK}-1}(c \geq 0).$$

Accordingly, when a single serving cell is configured (c=0), $o_{c=0,0}^{ACK}, o_{c=0,1}^{ACK}, \ldots,$ $$O^{ACK}_{c=0,o_{c=0}^{ACK}-1}$$

are input to the channel coding block (S170). Alternatively, when two serving cells are configured (c=0 and c=1), $o_{c=0,0}^{ACK}, o_{c=0,1}^{ACK}, \ldots,$ $$O^{ACK}_{c=0,o_{c=0}^{ACK}-1}$$

$+o_{c=1,0}^{ACK}, o_{c=1,1}^{ACK}, \ldots,$ $$O^{ACK}_{c=1,o_{c=0}^{ACK}-1}$$

are input to the channel coding block (S170). Output bits of the channel coding block (S170) are input to a channel interleaver block (S190). Data, output bits of a control multiplexing block (S180) and output bits of a channel coding block (S160) for an RI are also input to the channel interleaver block (S190). The RI is selectively present.

When PUCCH format 3 is set in a TDD system, a HARQ-ACK payload for each cell can include individual ACK/NACK for each downlink transmission process. However, when plural cells are aggregated and the number of ACK/NACK for each cell is large, a considerably large number of bits may be needed to transmit individual ACK/NACK for each cell. Accordingly, it may be necessary to reduce the number of transmitted bits rather than transmitting individual ACK/NACK even when PUCCH format 3 is set, as in the channel selection scheme. In this case, the number of PUCCH resources necessary for ACK/NACK transmission using channel selection can be limited to a predetermined number (e.g. 4) due to characteristics of channel selection. Accordingly, ACK/NACK states can be appropriately configured and mapped through a method of compressing ACK/NACK (e.g. using consecutive ACKs) and mapping some ACK/NACK states to the same bits (when M (or W)=4, for example) such that 2-bit ACK/NACK (i.e. four states) can be generated for each CC. However, in the case of PUCCH format 3, only ACK/NACK compression can be applied without mapping some ACK/NACK states to the same bits (referred to as "method 1" hereinafter) since a large payload of up to 20 bits can be supported. Otherwise, even in the case of PUCCH format 3, both ACK/NACK compression (into 2-bit or 4-bit ACK/NACK) and mapping of some ACK/NACK states to the same bits can be applied (referred to as "method 2" hereinafter) in consideration of ACK/NACK transmission coverage, as described above.

For example, ACK/NACK state-to-RM code input bit mapping for a case in which 5≤M (or W)≤9 may be necessary to transmit ACK/NACK using PUCCH format 3 through ACK/NACK compression/redundant mapping or to piggyback ACK/NACK on a PUSCH for TDD UL-DL configurations shown in Table 1 and TDD UL-DL configurations introduced in future. When M (or W)≤4, the above-described method can be used.

W can be used to determine the range of effective ACK/NACK responses to be piggybacked on a PUSCH and can signal a maximum number of the numbers of pieces of DL data scheduled for respective CCs. Considering that UL DAI is 2-bit information, modulo-4 operation is applicable to W exceeding 4. Accordingly, W can be replaced by W+4 $\lceil (U_{max}-W)/4 \rceil$ in the present invention. Here, $U_{max}$ denotes a maximum number of the numbers of pieces of DL data for respective CCs, received by a UE.

A description will be given of an ACK/NACK state mapping and coding method for transmitting ACK/NACK through PUCCH format 3 or piggybacking ACK/NACK on a PUSCH when plural CCs are aggregated in a TDD system according to embodiments of the present invention.

Embodiment 1

The present embodiment proposes ACK/NACK state-to-RM code input bit mapping for each CC when 5≤M (or W)≤9 such that method 2 (i.e. ACK/NACK compression/redundant mapping) can be applied to the TDD UL-DL configurations shown in Table 1 and TDD UL-DL configurations introduced in future. As described above with reference to Table 20, ACK/NACK state mapping is performed such that the Euclidian distance between ACK/NACK states is maximized to minimize the number of ACK/NACK response errors when bit errors are generated and gray coding can be maintained between neighboring ACK/NACK states. Redundant mapping is applied to some ACK/NACK states having a low risk of misrecognition such that ACK/NACK transmission performance deterioration can be minimized while all ACK/NACK states can be covered.

Specifically, when M=5, 6, 7, 8 and 9, ACK/NACK state-to-RM code input bit mapping, shown in Tables 21 to 25, can be applied to each CC to transmit ACK/NACK using PUCCH format 3. When M=1, 2, 3 and 4, the above-described method is applicable. For example, the method of transmitting 1 bit or 2 bits for each ACK/NACK state can be applied when M=1, 2, 3 and 4, as described above with reference to Tables 7 to 20. Otherwise, the method of transmitting individual ACK/NACK can be applied when M=1, 2, 3 and 4.

Similarly, when W=5, 6, 7, 8 and 9, ACK/NACK state-to-RM code input bit mapping, shown in Tables 21 to 25, can be applied to each CC to piggyback ACK/NACK on a PUSCH. When W=1, 2, 3 and 4, the method described above with reference to Tables 7 to 20 is applicable. For example, the method of transmitting 2 bits for each ACK/NACK state when M=3 and 4 and transmitting individual ACK/NACK when M=1 and 2 can be applied, as described above with reference to Tables 7 to 20.

ACK/NACK state-to-RM code input bit mapping using Tables 21 to 25 is not limited to the above-described methods and applied in various manners. For example, only Table 25 can be applied to a case when M (or W)>n (e.g. n=2 or 4).

In the following description, ACK, NACK, DTX and NACK/DTX can be respectively represented as "A", "N", "D" and "N/D" for convenience.

Table 21 shows ACK/NACK state-to-RM code input bit mapping when M (or W)=5. As described above, XCC denotes an arbitrary CC, for example, PCC or SCC in Tables 21 to 25.

TABLE 21

| XCC HARQ-ACK(0), (1), (2), (3), (4) | RM code input bits |
|---|---|
| (A, A, A, N/D, any) | 1, 1 |
| (A, A, A, A, A) or (A, A, D, D, D) | 1, 0 |
| (A, A, A, A, N/D) or (A, D, D, D, D) | 0, 1 |
| (N/D, any, any, any, any), or (A, N/D, any, any, any) except for (A, D, D, D, D), or (A, A, N/D, any, any) except for (A, A, D, D, D) | 0, 0 |

Table 22 shows ACK/NACK state-to-RM code input bit mapping when M (or W)=6.

TABLE 22

| XCC HARQ-ACK(0), (1), (2), (3), (4), (5) | RM code input bits |
|---|---|
| (A, A, A, A, A, A) or (A, A, A, D, D, D) | 1, 1 |
| (A, A, A, A, A, N/D) or (A, A, D, D, D, D) | 1, 0 |
| (A, A, A, A, N/D, any) or (A, D, D, D, D, D) | 0, 1 |
| (N/D, any, any, any, any, any), or (A, N/D, any, any, any, any) except for (A, D, D, D, D, D), or (A, A, N/D, any, any, any) except for (A, A, D, D, D, D), or (A, A, A, N/D, any, any) except for (A, A, A, D, D, D) | 0, 0 |

Table 23 shows ACK/NACK state-to-RM code input bit mapping when M (or W)=7.

TABLE 23

| XCC HARQ-ACK(0), (1), (2), (3), (4), (5), (6) | RM code input bits |
|---|---|
| (A, A, A, A, A, A, N/D) or (A, A, A, D, D, D, D) | 1, 1 |
| (A, A, A, A, A, N/D, any) or (A, A, D, D, D, D, D) | 1, 0 |
| (A, A, A, A, A, A, A) or (A, A, A, A, D, D, D) or (A, D, D, D, D, D, D) | 0, 1 |
| (N/D, any, any, any, any, any, any) or (A, N/D, any, any, any, any, any) except for (A, D, D, D, D, D, D), or (A, A, N/D, any, any, any, any) except for (A, A, D, D, D, D, D), or (A, A, A, N/D, any, any, any) except for (A, A, A, D, D, D, D), or (A, A, A, A, N/D, any, any) except for (A, A, A, A, D, D, D) | 0, 0 |

Table 24 shows ACK/NACK state-to-RM code input bit mapping when M (or W)=8.

TABLE 24

| XCC HARQ-ACK(0), (1), (2), (3), (4), (5), (6), (7) | RM code input bits |
|---|---|
| (A, A, A, A, A, A, N/D, any) or (A, A, A, D, D, D, D, D) | 1, 1 |
| (A, A, A, A, A, A, A, A) or (A, A, A, A, A, D, D, D) or (A, A, D, D, D, D, D, D) | 1, 0 |
| (A, A, A, A, A, A, A, N/D) or (A, A, A, A, D, D, D, D) or (A, D, D, D, D, D, D, D) | 0, 1 |
| (N/D, any, any, any, any, any, any, any) or (A, N/D, any, any, any, any, any, any) except for (A, D, D, D, D, D, D, D), or (A, A, N/D, any, any, any, any, any) except for (A, A, D, D, D, D, D, D), or (A, A, A, N/D, any, any, any, any) except for (A, A, A, D, D, D, D, D), or (A, A, A, A, N/D, any, any, any) except for (A, A, A, A, D, D, D, D), or (A, A, A, A, A, N/D, any, any) except for (A, A, A, A, A, D, D, D) | 0, 0 |

Table 25 shows ACK/NACK state-to-RM code input bit mapping when M (or W)=9.

TABLE 25

| XCC HARQ-ACK(0), (1), (2), (3), (4), (5), (6), (7), (8) | RM code input bits |
|---|---|
| (A, A, A, A, A, A, A, A, A) or (A, A, A, A, A, A D, D, D) or (A, A, A, D, D, D, D, D, D) | 1, 1 |
| (A, A, A, A, A, A, A, A, N/D) or (A, A, A, A, A, D, D, D, D) or (A, A, D, D, D, D, D, D, D) | 1, 0 |
| (A, A, A, A, A, A, A, N/D, any) or (A, A, A, A, D, D, D, D, D) or (A, D, D, D, D, D, D, D, D) | 0, 1 |
| (N/D, any, any, any, any, any, any, any, any) or (A, N/D, any, any, any, any, any, any, any) except for (A, D, D, D, D, D, D, D, D), or (A, A, N/D, any, any, any, any, any, any) except for (A, A, D, D, D, D, D, D, D), or (A, A, A, N/D, any, any, any, any, any) except for (A, A, A, D, D, D, D, D, D), or (A, A, A, A, N/D, any, any, any, any) except for (A, A, A, A, D, D, D, D, D), or (A, A, A, A, A, N/D, any, any, any) except for (A, A, A, A, A, D, D, D, D), or (A, A, A, A, A, A, N/D, any, any) except for (A, A, A, A, A, A, D, D, D), or (A, A, A, A, A, A, A N/D, any) except for (A, A, A, A, A, A, D, D, D) | 0, 0 |

In Tables 21 to 25, XCC HARQ-ACK(i) represents an ACK/NACK response to XCC DL data corresponding to a PDCCH with V=(i modulo 4)+1. For example, in Tables 21 to 25, XCC HARQ-ACK(i) represents an ACK/NACK response to XCC DL data corresponding to a PDCCH with V=i+1 when i<4, an ACK/NACK response to XCC DL data corresponding to a PDCCH with V=i−3 when 4≤i<8 and an ACK/NACK response to XCC DL data corresponding to a PDCCH with V=i−7 when i=8. When DL data w/o PDCCH is present, XCC HARQ-ACK(0) is an ACK/NACK response to corresponding XCC DL data and HARQ-ACK(i) may be an ACK/NACK response to XCC DL data corresponding to a PDCCH with V=((i−1) modulo 4)+1. For example, HARQ-ACK(i) represents an ACK/NACK response to XCC DL data corresponding to a PDCCH with V=i when 1≤i<5 and represents an ACK/NACK response to XCC DL data corresponding to a PDCCH with V=i−4 when 5≤i<8.

Detailed operation when M=5 will now be described. When HARQ-ACK(0),(1),(2),(3),(4) of the PCC correspond to (A, A, A, N/D, any) and HARQ-ACK(0),(1),(2),(3),(4) of the SCC correspond to (A, N/D, any, any, any), the UE transmits ACK/NACK through PUCCH format 3 using 4-bit RM code input bits o(0), o(1), o(2), o(3)=(1, 1, 0, 0) mapped to corresponding ACK/NACK states in Table 21.

When W=6, HARQ-ACK(0),(1),(2),(3),(4),(5) of the PCC correspond to (A, A, D, D, D, D) and HARQ-ACK(0),(1),(2),(3),(4),(5) of the SCC correspond to (A, A, A, N/D, any, any), the UE transmits ACK/NACK through a PUSCH using 4-bit RM code input bits o(0), o(1), o(2), o(3)=(1, 0, 0, 0) mapped to corresponding ACK/NACK states in Table 22.

In Tables 21 to 25, RM code input bits "0, 1" and "1, 0" can be respectively changed to "1, 0" and "0, 1" and mapped to corresponding ACK/NACK states. Even if the RM code input bits are changed and mapped, the same effect can be obtained. Similarly, RM code input bits "0, 0" and "1, 1" in Tables 21 to 25 can be respectively changed to "1, 1" and "0, 0" and mapped to corresponding ACK/NACK states and the same effect can be obtained.

Figure 14:
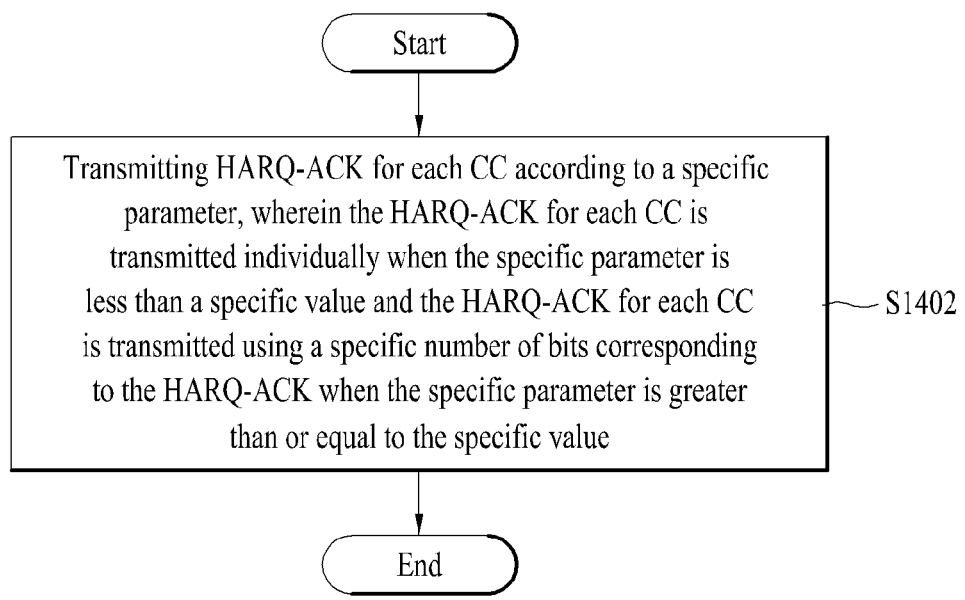
FIG. 14 is a flowchart illustrating a method for transmitting HARQ-ACK when carriers are aggregated in a TDD system according to an embodiment of the present invention.

FIG. 14 illustrates a HARQ-ACK transmission method 1400 in the case of carrier aggregation in a TDD system according to an embodiment of the present invention. While FIG. 14 shows an operation of a UE, operation corresponding thereto can be performed by a BS.

Referring to FIG. 14, the UE transmits HARQ-ACK for each CC according to a specific parameter. When the specific parameter is less than a specific value, HARQ-ACK for each CC can be individually transmitted. When the specific parameter is greater than or equal to the specific value, HARQ-ACK for each CC can be transmitted using a specific number of bits corresponding thereto (S1402).

Figure 15:
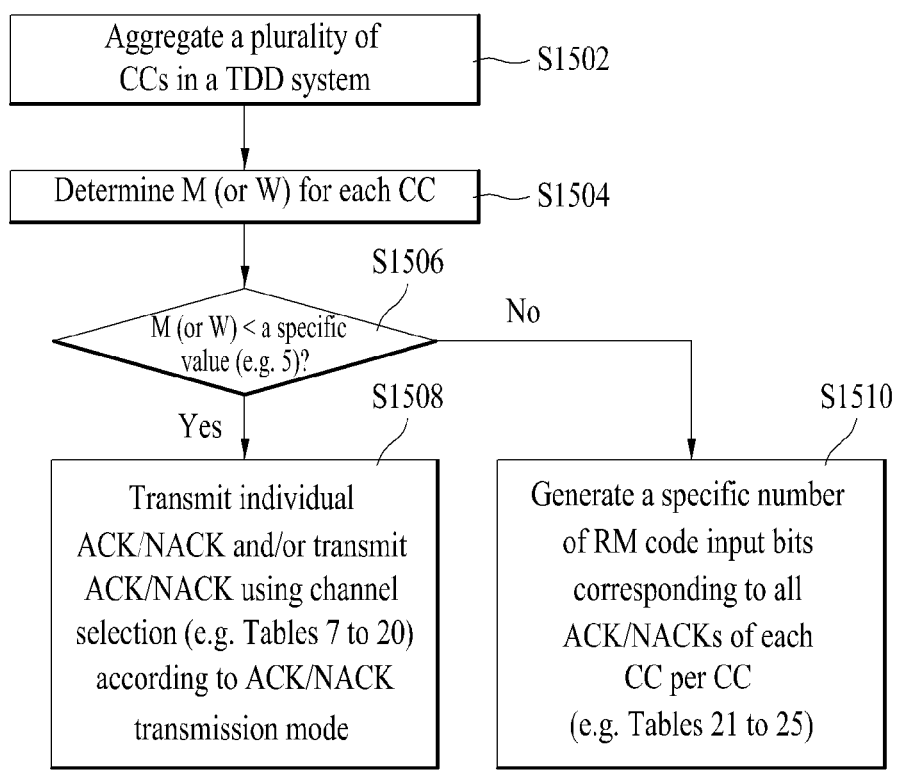
FIG. 15 a flowchart illustrating a method for transmitting HARQ-ACK when carriers are aggregated in a TDD system according to another embodiment of the present invention.

FIG. 15 is a flowchart illustrating a HARQ-ACK transmission method 1500 in the case of carrier aggregation in a TDD system according to another embodiment of the present invention. While FIG. 15 shows an operation of a UE, operation corresponding thereto can be performed by a BS.

Referring to FIG. 15, the UE can aggregate a plurality of CCs (S1502). Then, the UE can determine M or W for each aggregated CC (S1504). As described above, M denotes the number of DL subframes corresponding to a single UL subframe and W denotes a value indicated by a UL DAI field in a UL grant PDCCH. The UE determines whether M (or W) is less than 5 (S1506). When M (or W) is less than 5, the UE can generate RM code input bits for each CC (S1508), as described above with reference to Tables 7 to 20. When M (or W) is greater than or equal to 5, the UE can generate RM code input bits for each CC (S1510), as described above with reference to Tables 21 to 25.

Embodiment 2

The present embodiment proposes ACK/NACK state-to-RM code input bit mapping for each CC when 3≤M (or W)≤9 such that method 1 (i.e. ACK/NACK compression only) can be applied to the TDD UL-DL configurations shown in Table 1 and TDD UL-DL configurations introduced in future. When M (or W)=9, ACK/NACK state-to-RM code input bit mapping is designed. When M (or W)<9, ACK/NACK transmission is performed using PUCCH format 3 or a PUSCH using only a subset in mapping in the case of M (or W)=9. When M (or W)=1 or 2, the method described above with reference to Tables 12 to 16 is applicable.

For example, mapping can be performed such that a binary sequence {RM code input bits (0),(1),(2),(3)} represents the number of consecutive ACKs in each ACK/NACK state, as shown in Table 26. RM input bit (0) may be a least significant bit (LSB) and RM input bit (3) may be a most signification bit (MSB). For example, when {RM input bits (0),(1),(2),(3)}={1, 0, 1, 0}, {RM input bits (0),(1),(2),(3)} can be mapped to an ACK/NACK state including 5 consecutive ACKs. Otherwise, RM input bit (3) may be an LSB and RM input bit (0) may be an MSB. For example, when {RM input bits (0),(1),(2),(3)}={0, 1, 0, 1}, {RM input bits (0),(1),(2),(3)} can be mapped to an ACK/NACK state including 5 consecutive ACKs.

Table 26 shows ACK/NACK state-to-RM code input bit mapping based on the number of consecutive ACKs.

TABLE 26

| XGC HARQ-ACK(0) | XCC HARQ-ACK(1) | XCC HARQ-ACK(2) | XCC HARQ-ACK(3) | XGC HARQ-ACK(4) | XCC HARQ-ACK(5) | XCC HARQ-ACK(8) | XCC HARQ-ACK(7) | XGC HARQ-ACK(8) | RM Input Bit(0) | RM Input Bit(1) | RM Input Bit(2) | RM Input Bit(3) |
|---|---|---|---|---|---|---|---|---|---|---|---|---|
| A | A | A | A | A | A | A | A | A | 1 | 0 | 0 | 1 |
| A | A | A | A | A | A | A | A | N/D | 0 | 0 | 0 | 1 |

TABLE 26-continued

| XGC HARQ-ACK(0) | XCC HARQ-ACK(1) | XCC HARQ-ACK(2) | XCC HARQ-ACK(3) | XGC HARQ-ACK(4) | XCC HARQ-ACK(5) | XCC HARQ-ACK(8) | XCC HARQ-ACK(7) | XGC HARQ-ACK(8) | RM Input Bit(0) | RM Input Bit(1) | RM Input Bit(2) | RM Input Bit(3) |
|---|---|---|---|---|---|---|---|---|---|---|---|---|
| A | A | A | A | A | A | A | N/D | Any | 1 | 1 | 1 | 0 |
| A | A | A | A | A | A | N/D | any | any | 0 | 1 | 1 | 0 |
| A | A | A | A | A | N/D | any | any | any | 1 | 0 | 1 | 0 |
| A | A | A | A | N/D | any | any | any | any | 0 | 0 | 1 | 0 |
| A | A | A | N/D | any | any | any | any | any | 1 | 1 | 0 | 0 |
| A | A | N/D | any | any | any | any | any | any | 0 | 1 | 0 | 0 |
| A | N/D | any | any | any | any | any | any | any | 1 | 0 | 0 | 0 |
| N/D | any | any | any | any | any | any | any | any | 0 | 0 | 0 | 0 |

Alternatively, bit reversing is applicable to RM input bits (i) corresponding to an RM input bit string with different scales such that gray coding between neighboring ACK/NACK states can be satisfied, as shown in Table 27. For example, RM input bit (0) of Table 26 can be reversed such as 0→1→0 . . . , as shown in Table 27. RM input bit (1) can be reserved such as 0, 0→1, 1→0, 0 . . . RM input bit (3) can be reversed such as 0→1→0 . . . RM input bit (2) can be reversed such as 0, 0→1, 1→0, 0 . . . .

Table 27 shows ACK/NACK state-to-RM code input bit mapping according to gray coding.

if M (or W)=L. Accordingly, RM input bits can be determined as RM input bit (0), . . . , RM input bit $\lceil \log_2(L+1) \rceil_{-1}$. That is, ACK/NACK states of XCC HARQ-ACK(i) corresponding to and RM input bits corresponding thereto are excluded from reference targets and RM input bits can be determined with reference to only XCC HARQ-ACK(i) corresponding to i≤(L−1) from among the other ACK/NACK states. For example, when L=5, ACK/NACK state-to-RM code input bit

TABLE 27

| XCC HARQ-ACK(0) | XCC HARQ-ACK(1) | XCC HARQ-ACK(2) | XCC HARQ-ACK(3) | XCC HARQ-ACK(4) | XCC HARQ-ACK(5) | XCC HARQ-ACK(6) | XCC HARQ-ACK(7) | XCC HARQ-ACK(8) | RM Input Bit(0) | RM Input Bit(1) | RM Input Bit(2) | RM Input Bit(3) |
|---|---|---|---|---|---|---|---|---|---|---|---|---|
| A | A | A | A | A | A | A | A | A | 1 | 0 | 1 | 1 |
| A | A | A | A | A | A | A | A | N/D | 0 | 0 | 1 | 1 |
| A | A | A | A | A | A | A | N/D | Any | 0 | 0 | 1 | 0 |
| A | A | A | A | A | A | N/D | any | any | 1 | 0 | 1 | 0 |
| A | A | A | A | A | N/D | any | any | any | 1 | 1 | 1 | 0 |
| A | A | A | A | N/D | any | any | any | any | 0 | 1 | 1 | 0 |
| A | A | A | N/D | any | any | any | any | any | 0 | 1 | 0 | 0 |
| A | A | N/D | any | any | any | any | any | any | 1 | 1 | 0 | 0 |
| A | N/D | any | any | any | any | any | any | any | 1 | 0 | 0 | 0 |
| N/D | any | any | any | any | any | any | any | any | 0 | 0 | 0 | 0 |

When subsets of Tables 26 and 27 are used, the number of RM input bits for each CC can be determined as $\lceil \log_2(L+1) \rceil$▲ mapping can be performed with reference to only parts represented by thick lines in Tables 28 and 29.

TABLE 28

| XCC HARQ-ACK(0) | XCC HARQ-ACK(1) | XCC HARQ-ACK(2) | XCC HARQ-ACK(3) | XCC HARQ-ACK(4) | XCC HARQ-ACK(5) | XCC HARQ-ACK(6) | XCC HARQ-ACK(7) | XCC HARQ-ACK(8) | RM Input Bit(0) | RM Input Bit(1) | RM Input Bit(2) | RM Input Bit(3) |
|---|---|---|---|---|---|---|---|---|---|---|---|---|
| A | A | A | A | A | A | A | A | A | 1 | 0 | 0 | 1 |
| A | A | A | A | A | A | A | A | N/D | 0 | 0 | 0 | 1 |
| A | A | A | A | A | A | A | N/D | Any | 1 | 1 | 1 | 0 |
| A | A | A | A | A | A | N/D | any | any | 0 | 1 | 1 | 0 |
| A | A | A | A | A | N/D | any | any | any | 1 | 0 | 1 | 0 |
| A | A | A | A | N/D | any | any | any | any | 0 | 0 | 1 | 0 |
| A | A | A | N/D | any | any | any | any | any | 1 | 1 | 0 | 0 |
| A | A | N/D | any | any | any | any | any | any | 0 | 1 | 0 | 0 |
| A | N/D | any | any | any | any | any | any | any | 1 | 0 | 0 | 0 |
| N/D | any | any | any | any | any | any | any | any | 0 | 0 | 0 | 0 |

TABLE 29

| XCC HARQ-ACK(0) | XCC HARQ-ACK(1) | XCC HARQ-ACK(2) | XCC HARQ-ACK(3) | XCC HARQ-ACK(4) | XCC HARQ-ACK(5) | XCC HARQ-ACK(6) | XCC HARQ-ACK(7) | XCC HARQ-ACK(8) | RM Input Bit(0) | RM Input Bit(1) | RM Input Bit(2) | RM Input Bit(3) |
|---|---|---|---|---|---|---|---|---|---|---|---|---|
| A | A | A | A | A | A | A | A | A | 1 | 0 | 1 | 1 |
| A | A | A | A | A | A | A | A | N/D | 0 | 0 | 1 | 1 |
| A | A | A | A | A | A | A | N/D | Any | 0 | 0 | 1 | 0 |
| A | A | A | A | A | A | N/D | any | any | 1 | 0 | 1 | 0 |
| A | A | A | A | A | N/D | any | any | any | 1 | 1 | 1 | 0 |
| A | A | A | A | N/D | any | any | any | any | 0 | 1 | 1 | 0 |
| A | A | A | N/D | any | any | any | any | any | 0 | 1 | 0 | 0 |
| A | A | N/D | any | any | any | any | any | any | 1 | 1 | 0 | 0 |
| A | N/D | any | any | any | any | any | any | any | 1 | 0 | 0 | 0 |
| N/D | any | any | any | any | any | any | any | any | 0 | 0 | 0 | 0 |

Alternatively, Table 26 or 27 rather than a subset thereof is applicable to a case in which M (or W)>n (e.g. n=2). RM input bits can be arranged in order from RM input bit (0) to LSB or to MSB, as described above.

Figure 16:
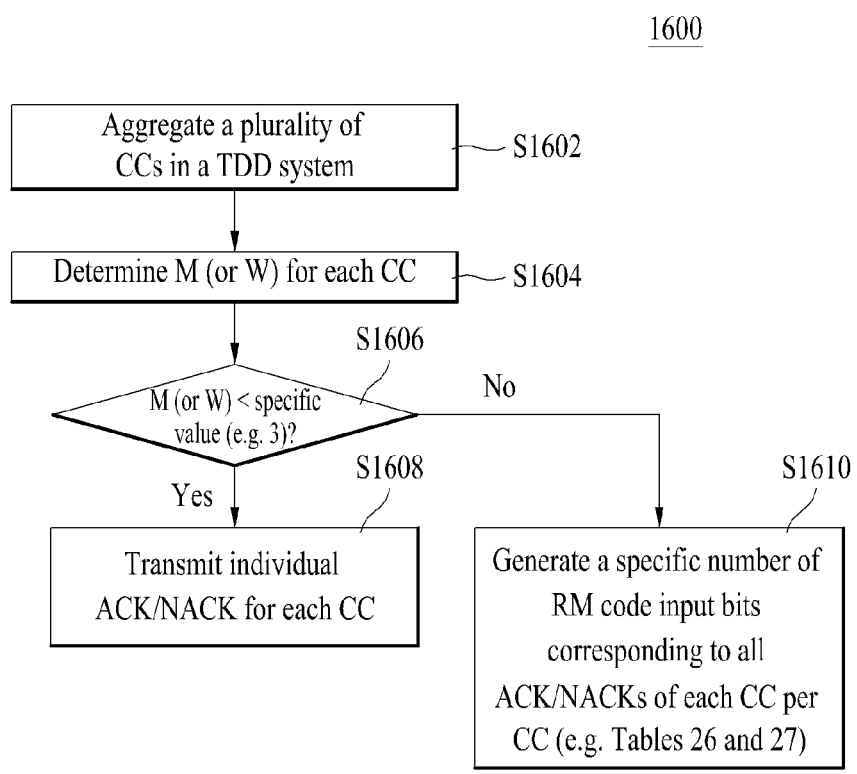
FIG. 16 a flowchart illustrating a method for transmitting HARQ-ACK when carriers are aggregated in a TDD system according to another embodiment of the present invention.

FIG. 16 illustrates a HARQ-ACK transmission method 1600 in the case of carrier aggregation in a TDD system according to another embodiment of the present invention. While FIG. 16 shows an operation of a UE, operation corresponding thereto can be performed by a BS.

Referring to FIG. 16, the UE can aggregate a plurality of CCs (S1602). Then, the UE can determine M or W for each aggregated CC (S1604). As described above, M denotes the number of DL sub frames corresponding to a single UL subframe and W denotes a value indicated by a UL DAI field in a UL grant PDCCH. The UE determines whether M (or W) is less than 3 (S1606). When M (or W) is less than 3, the UE can generate individual ACK/NACK for each CC and transmit the same (S1608). When M (or W) is greater than or equal to 3, the UE can generate RM code input bits for each CC (S1610), as described above with reference to Table 26 or 27. In step S1610, the UE can use Table 26 or 27 or only a subset of Table 26 or 27 when M (or W) is less than 9.

According to the embodiments of the present invention, it is possible to efficiently map ACK/NACK states, to encode ACK/NACK and to transmit the encoded ACK/NACK during ACK/NACK transmission using PUCCH format 3 and ACK/NACK piggybacking through a PUSCH when plural CCs are aggregated in a TDD system.

Figure 17:
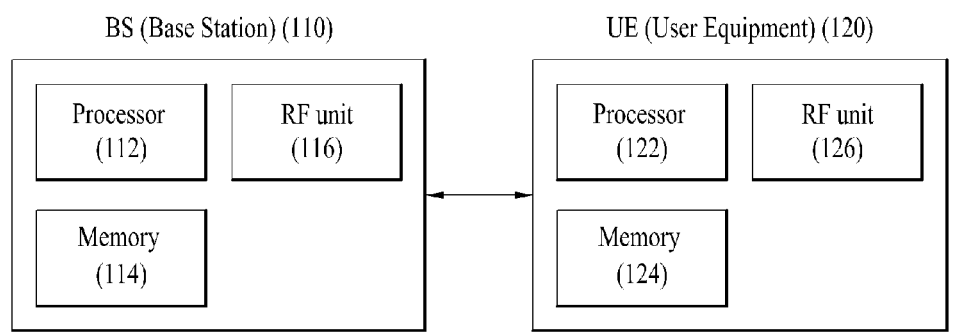
FIG. 17 illustrates a BS and UE applicable to embodiments of the present invention.

FIG. 17 illustrates a BS and UE applicable to embodiments of the present invention. In the case of a system including a relay, the BS or UE can be replaced by the relay.

Referring to FIG. 17, a wireless communication system includes a BS 110 and a UE 120. The BS includes a processor 112, a memory 114 and an RF unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 112 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been given centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication devices such as a UE, a relay, a BS, etc.

The invention claimed is:

1. A method for transmitting uplink control information by a user equipment in a wireless communication system supporting carrier aggregation and operating in time division duplexing (TDD), the method comprising:
when a specific parameter is less than a specific value, generating, by the user equipment, hybrid automatic repeat request-acknowledgement (HARQ-ACK) bits including an individual bit value corresponding to a respective HARQ-ACK for each of a plurality of component carriers (CCs);
when the specific parameter is equal to or greater than the specific value, generating, by the user equipment, the HARQ-ACK bits including bit values corresponding to all HARQ-ACKs for each of the plurality of CCs; and
transmitting, by the user equipment, the uplink control information including the generated HARQ-ACK bits,
wherein when the specific parameter is 5, the specific value is 5 and a number of the bit values is 2, a mapping relationship between the HARQ-ACKs and the bit values is given by the following table:

| HARQ-ACK (0), (1), (2), (3), (4) | Bit values |
| --- | --- |
| (A, A, A, N/D, any) | a0, a1 |
| (A, A, A, A) or (A, A, D, D, D) | b0, b1 |
| (A, A, A, A, N/D) or (A, D, D, D, D) | c0, c1 |
| (N/D, any, any, any, any), or (A, N/D, any, any, any) except for (A, D, D, D, D), or (A, A, N/D, any, any) except for (A, A, D, D, D) | d0, d1 | wherein {(a0, a1), (b0, b1), (c0, c1), (d0, d1)} corresponds to one of {(1, 1), (1, 0), (0, 1), (0, 0)}, {(1, 1), (0, 1), (1, 0), (0, 0)}, {(0, 0), (1, 0), (0, 1), (1, 1)} or {(0, 0), (0, 1), (1, 0), (1, 1)}, and
wherein "A" represents ACK (acknowledgement), "D" represents DTX (discontinuous transmission), "N/D" represents NACK (negative ACK) or DTX, and "any" represents one of ACK, NACK or DTX.

2. The method according to claim 1, wherein, when a downlink signal transmitted without physical downlink control channel (PDCCH) is present, the HARQ-ACK(0) represents an ACK/NACK response to the downlink signal transmitted without PDCCH and the HARQ-ACK(i) for i=1, 2, 3 or 4 represents an ACK/NACK response to a downlink signal corresponding to a PDCCH with a downlink downlink assignment index (DAI) value V of i, and
wherein when the downlink signal transmitted without PDCCH is not present, the HARQ-ACK(i) for i=0, 1, 2, 3 or 4 represents an ACK/NACK response to downlink data corresponding to a PDCCH with a downlink DAI value V of (i modulo 4)+1.

3. The method according to claim 1, wherein when the specific value is 3, a mapping relationship between the HARQ-ACKs and the bit values is given by the following table:

| HARQ-ACK (0) | HARQ-ACK (1) | HARQ-ACK (2) | HARQ-ACK (3) | HARQ-ACK (4) | HARQ-ACK (5) | HARQ-ACK (6) | HARQ-ACK (7) | HARQ-ACK (8) | Bit value (0) | Bit value (1) | Bit value (2) | Bit value (3) |
| --- | --- | --- | --- | --- | --- | --- | --- | --- | --- | --- | --- | --- |
| A | A | A | A | A | A | A | A | A | 1 | 0 | 0 | 1 |
| A | A | A | A | A | A | A | A | N/D | 0 | 0 | 0 | 1 |
| A | A | A | A | A | A | A | N/D | any | 1 | 1 | 1 | 0 |
| A | A | A | A | A | A | N/D | any | any | 0 | 1 | 1 | 0 |
| A | A | A | A | A | N/D | any | any | any | 1 | 0 | 1 | 0 |
| A | A | A | A | N/D | any | any | any | any | 0 | 0 | 1 | 0 |
| A | A | A | N/D | any | any | any | any | any | 1 | 1 | 0 | 0 |
| A | A | N/D | any | any | any | any | any | any | 0 | 1 | 0 | 0 |
| A | N/D | any | any | any | any | any | any | any | 1 | 0 | 0 | 0 |
| N/D | any | any | any | any | any | any | any | any | 0 | 0 | 0 | 0 | wherein when the specific parameter has a value of L, the specific number of bits values are determined by ⌈log₂(L+1)⌉.

4. The method according to claim 1, wherein when the specific value is 3, a mapping relationship between the HARQ-ACKs and the bit values is given by the following table:

| HARQ-ACK (0) | HARQ-ACK (1) | HARQ-ACK (2) | HARQ-ACK (3) | HARQ-ACK (4) | HARQ-ACK (5) | HARQ-ACK (6) | HARQ-ACK (7) | HARQ-ACK (8) | Bit value (0) | Bit value (1) | Bit value (2) | Bit value (3) |
| --- | --- | --- | --- | --- | --- | --- | --- | --- | --- | --- | --- | --- |
| A | A | A | A | A | A | A | A | A | 1 | 0 | 0 | 1 |
| A | A | A | A | A | A | A | A | N/D | 0 | 0 | 0 | 1 |
| A | A | A | A | A | A | A | N/D | any | 1 | 1 | 1 | 0 |

-continued

| HARQ-ACK (0) | HARQ-ACK (1) | HARQ-ACK (2) | HARQ-ACK (3) | HARQ-ACK (4) | HARQ-ACK (5) | HARQ-ACK (6) | HARQ-ACK (7) | HARQ-ACK (8) | Bit value (0) | Bit value (1) | Bit value (2) | Bit value (3) |
|---|---|---|---|---|---|---|---|---|---|---|---|---|
| A | A | A | A | A | A | N/D | Any | any | 0 | 1 | 1 | 0 |
| A | A | A | A | A | N/D | any | Any | any | 1 | 0 | 1 | 0 |
| A | A | A | A | N/D | any | any | Any | any | 0 | 0 | 1 | 0 |
| A | A | A | N/D | any | any | any | Any | any | 1 | 1 | 0 | 0 |
| A | A | N/D | any | any | any | any | Any | any | 0 | 1 | 0 | 0 |
| A | N/D | any | any | any | any | any | Any | any | 1 | 0 | 0 | 0 |
| N/D | any | any | any | any | any | any | Any | any | 0 | 0 | 0 | 0 | wherein when the specific parameter has a value of L, the specific number of bits values are determined by $\lceil \log_2 (L+1) \rceil$.

5. The method according to claim 1,
wherein the specific parameter represents a number M of downlink subframes corresponding to an uplink subframe in which the uplink control information is transmitted or an uplink downlink assignment index (DAI) value W, and
wherein the uplink control information is transmitted using physical uplink control channel (PUCCH) format 3.

6. A communication device configured to transmit uplink control information in a wireless communication system supporting carrier aggregation and operating in time division duplexing (TDD), the communication device comprising:
a radio frequency (RF) unit; and
a processor operatively connected to the RF unit and configured to:
when a specific parameter is less than a specific value, generate hybrid automatic repeat request-acknowledgement (HARQ-ACK) bits including an individual bit value corresponding to a respective HARQ-ACK for each of a plurality of component carriers (CCs),
when the specific parameter is equal to or larger than the specific value, generate the HARQ-ACK bits including bit values corresponding to all HARQ-ACKs for each of the plurality of CCs, and
control the RF unit to transmit the uplink control information including the generated HARQ-ACK bits,
wherein when the specific parameter is 5, the specific value is 5 and a number of the bit values is 2, a mapping relationship between the HARQ-ACKs and the bit values is given by the following table:

| HARQ-ACK (0), (1), (2), (3), (4) | Bit values |
|---|---|
| (A, A, A, N/D, any) | a0, a1 |
| (A, A, A, A, A) or (A, A, D, D, D) | b0, b1 |
| (A, A, A, A, N/D) or (A, D, D, D, D) | c0, c1 |
| (N/D, any, any, any, any), or (A, N/D, any, any, any) except for (A, D, D, D, D), or (A, A, N/D, any, any) except for (A, A, D, D, D) | d0, d1 | wherein {(a0, a1), (b0, b1), (c0, c1), (d0, d1)} corresponds to one of {(1, 1), (1, 0), (0, 1), (0, 0)}, {(1, 1), (0, 1), (1, 0), (0, 0)}, {(0, 0), (1, 0), (0, 1), (1, 1)} or {(0, 0), (0, 1), (1, 0), (1, 1)}, and
wherein "A" represents ACK (acknowledgement), "D" represents DTX (discontinuous transmission), "N/D" represents NACK (negative ACK) or DTX, and "any" represents one of ACK, NACK, or DTX.

7. The communication device according to claim 6,
wherein, when a downlink signal transmitted without physical downlink control channel (PDCCH) is present, the HARQ-ACK(0) represents an ACK/NACK response to the downlink signal transmitted without PDCCH and the HARQ-ACK(i) for i=1, 2, 3 or 4 represents an ACK/NACK response to a downlink signal corresponding to a PDCCH with a downlink downlink assignment index (DAI) value V of i, and
wherein when the downlink signal transmitted without PDCCH is not present, the HARQ-ACK(i) for i=0, 1, 2, 3 or 4 represents an ACK/NACK response to downlink data corresponding to a PDCCH with a downlink DAI value V of (i modulo 4)+1.

8. The communication device according to claim 6,
wherein when the specific value is 3, a mapping relationship between the HARQ-ACKs and the bit values is given by the following table:

| HARQ-ACK (0) | HARQ-ACK (1) | HARQ-ACK (2) | HARQ-ACK (3) | HARQ-ACK (4) | HARQ-ACK (5) | HARQ-ACK (6) | HARQ-ACK (7) | HARQ-ACK (8) | Bit value (0) | Bit value (1) | Bit value (2) | Bit value (3) |
|---|---|---|---|---|---|---|---|---|---|---|---|---|
| A | A | A | A | A | A | A | A | A | 1 | 0 | 1 | 1 |
| A | A | A | A | A | A | A | A | N/D | 0 | 0 | 1 | 1 |
| A | A | A | A | A | A | A | N/D | any | 0 | 0 | 1 | 0 |
| A | A | A | A | A | A | N/D | Any | any | 1 | 0 | 1 | 0 |
| A | A | A | A | A | N/D | any | Any | any | 1 | 1 | 1 | 0 |
| A | A | A | A | N/D | any | any | Any | any | 0 | 1 | 1 | 0 |
| A | A | A | N/D | any | any | any | Any | any | 0 | 1 | 0 | 0 |
| A | A | N/D | any | any | any | any | Any | any | 1 | 1 | 0 | 0 |
| A | N/D | any | any | any | any | any | Any | any | 1 | 0 | 0 | 0 |
| N/D | any | any | any | any | any | any | Any | any | 0 | 0 | 0 | 0 | wherein when the specific parameter has a value of L, the specific number of bits values are determined by $\lceil \log_2(L+1) \rceil$.

9. The communication device according to claim 6, wherein when the specific value is 3, mapping relationship between the HARQ-ACK and the bit values is given by the following table:

| HARQ-ACK (0) | HARQ-ACK (1) | HARQ-ACK (2) | HARQ-ACK (3) | HARQ-ACK (4) | HARQ-ACK (5) | HARQ-ACK (6) | HARQ-ACK (7) | HARQ-ACK (8) | Bit value (0) | Bit value (1) | Bit value (2) | Bit value (3) |
|---|---|---|---|---|---|---|---|---|---|---|---|---|
| A | A | A | A | A | A | A | A | A | 1 | 0 | 1 | 1 |
| A | A | A | A | A | A | A | A | N/D | 0 | 0 | 1 | 1 |
| A | A | A | A | A | A | A | N/D | any | 0 | 0 | 1 | 0 |
| A | A | A | A | A | A | N/D | Any | any | 1 | 0 | 1 | 0 |
| A | A | A | A | A | N/D | any | Any | any | 1 | 1 | 1 | 0 |
| A | A | A | A | N/D | any | any | Any | any | 0 | 1 | 1 | 0 |
| A | A | A | N/D | any | any | any | Any | any | 0 | 1 | 0 | 0 |
| A | A | N/D | any | any | any | any | Any | any | 1 | 1 | 0 | 0 |
| A | N/D | any | any | any | any | any | Any | any | 1 | 0 | 0 | 0 |
| N/D | any | any | any | any | any | any | Any | any | 0 | 0 | 0 | 0 | wherein when the specific parameter has a value of L, the specific number of bits values are determined by $\lceil \log_2(L+1) \rceil$.

10. The communication device according to claim 6, wherein the specific parameter represents a number M of downlink subframes corresponding to an uplink subframe in which the uplink control information is transmitted or an uplink downlink assignment index (DAI) value W, and
wherein the uplink control information is transmitted using physical uplink control channel (PUCCH) format 3.

* * * * *